(12) United States Patent  
Ayukawa et al.

(10) Patent No.: US 6,697,906 B1  
(45) Date of Patent: Feb. 24, 2004

(54) SEMICONDUCTOR DEVICE SUPPORTING INTEGRATED DATA TRANSFER BRIDGING BETWEEN CPU MEMORY AND I/O DEVICE

(75) Inventors: Kazushige Ayukawa, Kokubunji (JP); Jun Sato, Mitaka (JP); Takashi Miyamoto, Tokyo (JP); Kenichiro Omura, Higashimurayama (JP); Hiroyuki Hamasaki, Higashimurayama (JP); Hiroshi Takeda, Higashiyamato (JP); Makoto Takano, Sayama (JP); Isamu Mochizuki, Tachikawa (JP); Yasuhiko Hoshi, Iruma (JP); Kazuhiro Hirade, Kokubunji (JP); Ryuichi Murashima, Kokubunji (JP)

(73) Assignees: Renesas Technology Corporation, Tokyo (JP); Hitachi ULSI Systems Co., Ltd., Tokyo (JP)

( * ) Notice: Subject to any disclaimer, the term of this patent is extended or adjusted under 35 U.S.C. 154(b) by 0 days.

(21) Appl. No.: 09/561,340

(22) Filed: Apr. 28, 2000

(30) Foreign Application Priority Data

May 6, 1999 (JP) ............................................. 11-125595

(51) Int. Cl.[7] ................................................. G06F 1/00
(52) U.S. Cl. ....................... 710/316; 710/305; 710/306; 710/309
(58) Field of Search ................................. 710/305–316, 710/107, 110, 112–113, 22, 23, 27, 29, 52, 61, 119, 125, 241, 243

(56) References Cited

U.S. PATENT DOCUMENTS

| | | | | |
|---|---|---|---|---|
| 5,621,902 A | * | 4/1997 | Cases et al. ................ | 710/305 |
| 5,822,549 A | * | 10/1998 | LaBerge ..................... | 710/107 |
| 5,828,856 A | * | 10/1998 | Bowes et al. ............... | 710/209 |
| 5,848,249 A | * | 12/1998 | Garbus et al. .............. | 710/312 |
| 5,859,988 A | * | 1/1999 | Ajanovic et al. ........... | 710/312 |
| 5,875,310 A | * | 2/1999 | Buckland et al. .......... | 710/307 |
| 5,878,237 A | * | 3/1999 | Olarig ........................ | 710/208 |
| 5,974,471 A | * | 10/1999 | Belt ............................. | 710/1 |
| 5,978,866 A | * | 11/1999 | Nain ........................... | 710/22 |
| 5,983,301 A | * | 11/1999 | Baker et al. ................ | 710/113 |
| 5,983,302 A | * | 11/1999 | Christiansen et al. ...... | 710/113 |
| 5,987,555 A | * | 11/1999 | Alzien et al. ............... | 710/309 |
| 6,067,595 A | * | 5/2000 | Lindenstruth ............... | 710/313 |
| 6,141,718 A | * | 10/2000 | Garnett et al. ............. | 710/313 |
| 6,219,724 B1 | * | 4/2001 | Kim et al. .................... | 710/22 |

FOREIGN PATENT DOCUMENTS

| | | |
|---|---|---|
| JP | 9-259074 | 8/1995 |
| JP | 7-219887 | 10/1997 |

* cited by examiner

Primary Examiner—Paul R. Myers  
Assistant Examiner—Raymond N Phan

(57) ABSTRACT

A semiconductor device is connected to a CPU, a memory and I/O devices to serve as a data transfer bridge for efficient data transfer between the memory and the I/O devices. A CPU interface and a plurality of I/O interfaces included in a bridge chip are connected through an internal bus to a memory interface included in the bridge chip. Each I/O interface has a read/write buffer and a DMAC. An arbiter included in the bridge chip determines a bus master for which data transfer is permitted in response to requests for data transfer from each of the CPU interface and the DMAC to the memory. Each of the I/O interfaces has a control function to skip part of areas in the memory when transferring data between the memory and the I/O interface.

18 Claims, 23 Drawing Sheets

FIG. 11A (a)
| BIT | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| | SR | EXT REQ | – | – | – | – | – | – | – | – | – | – | R/W | INTE | INT | DE |
| DEFAULT VALUE | 0 | * | – | – | – | – | – | – | – | – | – | – | 0 | 0 | 0 | 0 |
| R/W | R/W | R | – | – | – | – | – | – | – | – | – | – | R/W | R/W | R/W | R/W |

(b)
| BIT | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| | – | – | – | – | – | – | – | – | – | – | – | MA20 | MA19 | MA18 | MA17 | MA16 |
| DEFAULT VALUE | 0 | 0 | 0 | 0 | 0 | 0 | 0 | 0 | 0 | 0 | 0 | 0 | 0 | 0 | 0 | 0 |
| R/W | R | R | R | R | R | R | R | R | R | R | R | R/W | R/W | R/W | R/W | R/W |

(c)
| BIT | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| | MA15 | MA14 | MA13 | MA12 | MA11 | MA10 | MA9 | MA8 | MA7 | MA6 | MA5 | MA4 | MA3 | MA2 | MA1 | MA0 |
| DEFAULT VALUE | 0 | 0 | 0 | 0 | 0 | 0 | 0 | 0 | 0 | 0 | 0 | 0 | 0 | 0 | 0 | 0 |
| R/W | R/W | R/W | R/W | R/W | R/W | R/W | R/W | R/W | R/W | R/W | R/W | R/W | R/W | R/W | R/W | R/W |

FIG. 11B (d)

| BIT | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| | - | - | - | - | - | - | - | - | - | - | - | - | TC19 | TC18 | TC17 | TC16 |
| DEFAULT VALUE | 0 | 0 | 0 | 0 | 0 | 0 | 0 | 0 | 0 | 0 | 0 | 0 | 0 | 0 | 0 | 0 |
| R/W | R | R | R | R | R | R | R | R | R | R | R | R | R/W | R/W | R/W | R/W |

(e)

| BIT | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| | TC15 | TC14 | TC13 | TC12 | TC11 | TC10 | TC9 | TC8 | TC7 | TC6 | TC5 | TC4 | TC3 | TC2 | TC1 | TC0 |
| DEFAULT VALUE | 0 | 0 | 0 | 0 | 0 | 0 | 0 | 0 | 0 | 0 | 0 | 0 | 0 | 0 | 0 | 0 |
| R/W | R/W | R/W | R/W | R/W | R/W | R/W | R/W | R/W | R/W | R/W | R/W | R/W | R/W | R/W | R/W | R/W |

(f)

| BIT | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| | SW15 | SW14 | SW13 | SW12 | SW11 | SW10 | SW9 | SW8 | SW7 | SW6 | SW5 | SW4 | SW3 | SW2 | SW1 | SW0 |
| DEFAULT VALUE | 0 | 0 | 0 | 0 | 0 | 0 | 0 | 0 | 0 | 0 | 0 | 0 | 0 | 0 | 0 | 0 |
| R/W | R/W | R/W | R/W | R/W | R/W | R/W | R/W | R/W | R/W | R/W | R/W | R/W | R/W | R/W | R/W | R/W |

(g)

| BIT | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| | - | - | - | - | OW11 | OW10 | OW9 | OW8 | OW7 | OW6 | OW5 | OW4 | OW3 | OW2 | OW1 | OW0 |
| DEFAULT VALUE | 0 | 0 | 0 | 0 | 0 | 0 | 0 | 0 | 0 | 0 | 0 | 0 | 0 | 0 | 0 | 0 |
| R/W | R | R | R | R | R/W | R/W | R/W | R/W | R/W | R/W | R/W | R/W | R/W | R/W | R/W | R/W |

FIG. 14(a) INPUT DEVICE → DRAM 3
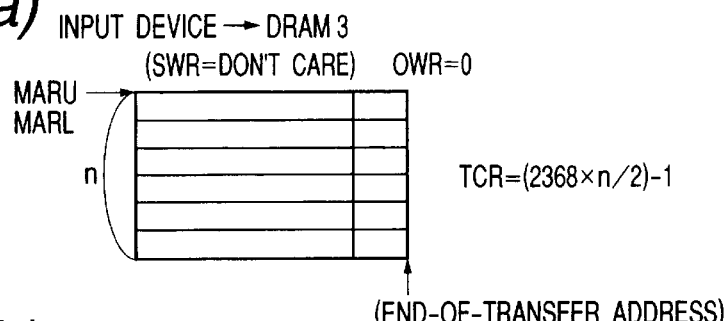
FIG. 14(b) DRAM 3 → CHIP 6
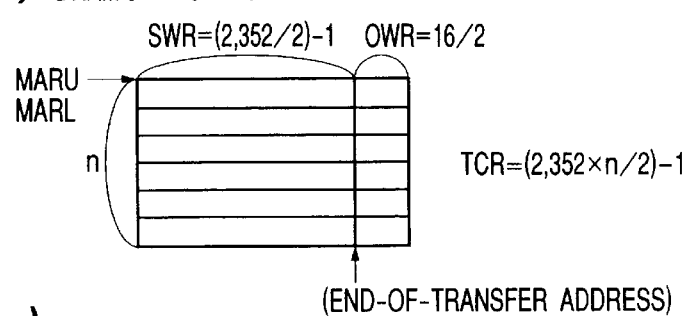
FIG. 14(c) CHIP 6 → DRAM 3
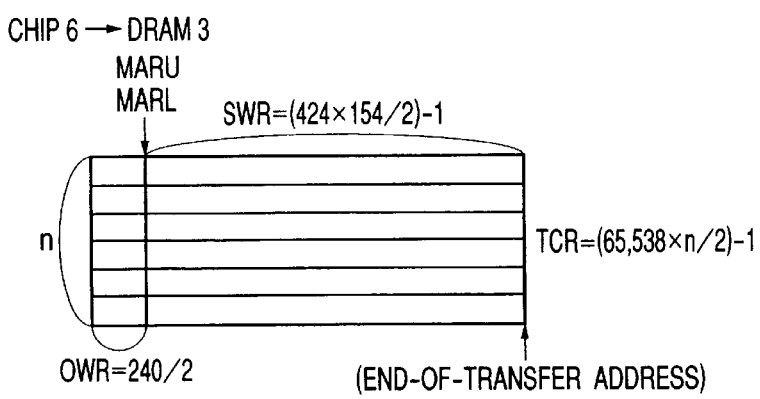
FIG. 14(d) DRAM 3 → I/O DEVICE
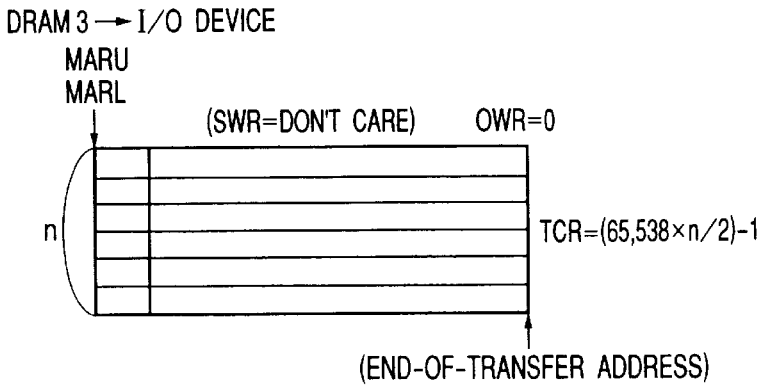

FIG. 18

(a)
| BIT | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
|  | — | — | CLBC | CLBL | — | — | — | — | — | — | — | — | — | — | — | — |
| DEFAULT VALUE |  |  | 0 | 0 |  |  |  |  |  |  |  |  |  |  |  |  |
| R/W |  |  | R/W | R/W |  |  |  |  |  |  |  |  |  |  |  |  |

(b)
| BIT | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
|  | BL15 | BL14 | BL13 | BL12 | BL11 | BL10 | BL9 | BL8 | BL7 | BL6 | BL5 | BL4 | BL3 | BL2 | BL1 | 0* |
| DEFAULT VALUE | 0 | 0 | 0 | 0 | 0 | 0 | 0 | 0 | 0 | 0 | 0 | 0 | 0 | 0 | 0 | 0 |
| R/W | R/W | R/W | R/W | R/W | R/W | R/W | R/W | R/W | R/W | R/W | R/W | R/W | R/W | R/W | R/W | R |

(c)
| BIT | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
|  | — | — | — | — | — | — | — | — | BC23 | BC22 | BC21 | BC20 | BC19 | BC18 | BC17 | BC16 |
| DEFAULT VALUE | 0 | 0 | 0 | 0 | 0 | 0 | 0 | 0 | 0 | 0 | 0 | 0 | 0 | 0 | 0 | 0 |
| R/W | R | R | R | R | R | R | R | R | R | R | R | R | R | R | R | R |

(d)
| BIT | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
|  | BC15 | BC14 | BC13 | BC12 | BC11 | BC10 | BC9 | BC8 | BC7 | BC6 | BC5 | BC4 | BC3 | BC2 | BC1 | BC0 |
| DEFAULT VALUE | 0 | 0 | 0 | 0 | 0 | 0 | 0 | 0 | 0 | 0 | 0 | 0 | 0 | 0 | 0 | 0 |
| R/W | R | R | R | R | R | R | R | R | R | R | R | R | R | R | R | R |

SEMICONDUCTOR DEVICE SUPPORTING INTEGRATED DATA TRANSFER BRIDGING BETWEEN CPU MEMORY AND I/O DEVICE

BACKGROUND OF THE INVENTION

The present invention relates to a semiconductor device to be interposed between a CPU and a memory, and an I/O device to serve as a data transfer bridge and, more particularly, to a semiconductor device that realizes efficient data transfer between a memory and an I/O device.

Large-capacity storage mediums, such as CD-ROMs and DVD-RAMs, are used currently as mediums for distributing music numbers and video programs to general families. It is expected that the distribution of multimedia data through CATV networks and the Internet will be further generalized, and personal computers and domestic AV equipment will need to deal with a large quantity of multimedia data. An apparatus that compresses music data recorded on a CD-ROM, accumulates compressed music data on an HDD, and transfers the data to a portable device has been proposed as a part of such a market trend and a technical trend.

A CD-ROM drive, a DVD drive and an HDD can be connected to current personal computers, and music data can be compressed and accumulated, and the compressed data can be transferred to a portable device by software installed in the personal computer. However, since the quantity of music data to be transferred is large, the personal computer takes much time for data transfer. Since music data stored in a CD-ROM or a DVD, and compression process unit are different from each other, and data unit after compression and the format of an HDD are different from each other, data format must be converted to transfer data between those devices differing from each other in format. Therefore, an apparatus capable of efficiently achieving data transfer has been desired.

SUMMARY OF THE INVENTION

Accordingly, it is an object of the present invention to provide a semiconductor device disposed between a CPU and a memory, and an I/O device and capable of efficiently transferring data between the memory and the I/O device.

According to the present invention, a semiconductor device which is connected to a CPU, a memory and a plurality of I/O devices to control data transfer between the memory and the I/O devices, includes a DMAC (direct memory access controller) channel corresponding to at least one of those I/O devices, and a bus arbiter which determines a bus master and permits the bus master data transfer in response to a request for data transfer from each of the CPU and the DMAC to the memory.

The semiconductor device according to the present invention may further include control circuits for controlling data transfer to transfer data skipping a part of an area on the memory when transferring data between the DMAC and the memory.

The semiconductor device according to the present invention may further include control circuits which control block by block data transfer so that format conversion can be achieved when data is transferred from the DMAC.

BRIEF DESCRIPTION OF THE DRAWINGS

FIG. 11A is a diagrammatic view of data stored in each of DMA control registers included in a bridge chip embodying the present invention;

FIG. 11B is a diagrammatic view of data stored in each of the DMA control register included in a bridge chip embodying the present invention;

FIG. 14 is a diagrammatic view of assistance in explaining data transfer by the DMAC;

FIG. 18 is a diagrammatic view of data stored in a data transfer register relating to an extension bus included in a bridge chip embodying the present invention;

DETAILED DESCRIPTION OF THE PREFERRED EMBODIMENTS

(1) Outline

Figure 1:
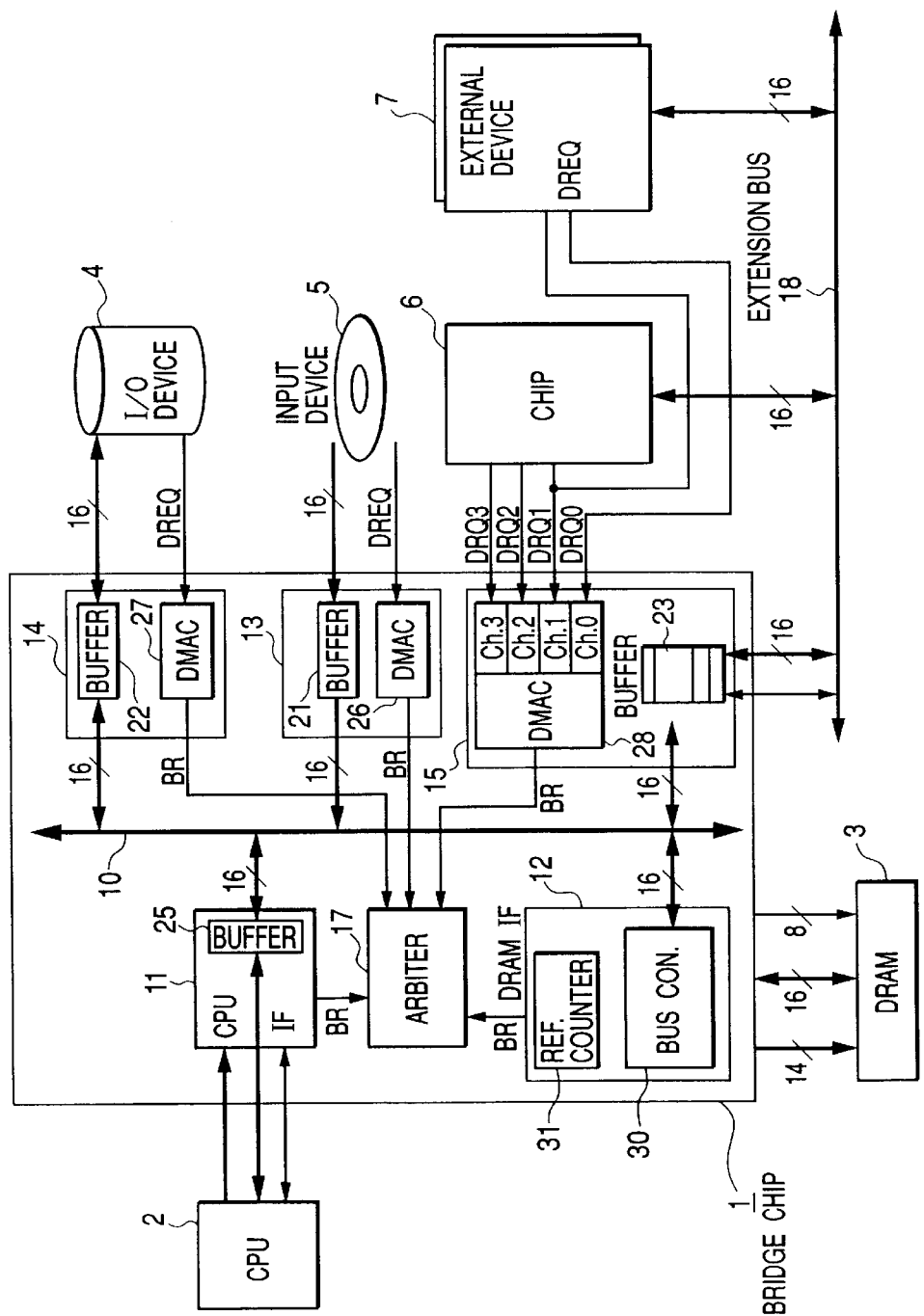
FIG. 1 is a block diagram showing the internal construction of a bridge chip in a preferred embodiment according to the present invention and devices connected thereto.

FIG. 1 shows a bridge chip 1, i.e., a semiconductor device, in a preferred embodiment according to the present invention and devices connected to the bridge chip 1. The bridge chip 1 has a CPU interface 11, a DRAM interface 12, an input interface 13, I/O interfaces 14 and 15 and an arbiter 17, which are connected to an internal bus 10. A CPU 2 formed in a microprocessor chip is connected to the CPU interface 11. The CPU 2 has a main memory, not shown. A DRAM 3, i.e., the local memory for the CPU 2, is connected to the DRAM interface 12. An input device 5 storing music data or the like is connected to the input interface 13. An I/O device 4 is connected to the I/O interface 14. A chip 6 for data compression/expansion is connected to the I/O interface 15. An external device 7 can be connected to the I/O interface 15. The chip 6 and the external device 7 are connected to the I/O interface 15 by an extension bus 18. The I/O device 4, the input device 5, the external device 7 will be generally referred to as I/O devices hereinafter.

The CPU interface 11 executes data transfer control when the CPU 2 gains access to the DRAM 3, the input interface 13, the I/O interface 14 or the I/O interface 15. The CPU interface 11 is provided with a buffer 25 which is used when data is transferred between the CPU interface 11 and the DRAM 3. The DRAM interface 12 is provided with a bus controller 30 and a refresh counter 31, and executes data transfer control when data is transferred between the DRAM 3, and the CPU interface 11, the input interface 13, the I/O interface 14 or the I/O interface 15.

The input interface 13, the I/O interface 14 and the I/O interface 15 are provided with buffers 21, 22 and 23, respectively, to enable efficient data transfer through the internal bus 10 between the I/O device and the DRAM 3. The input interface 13 and the I/O interfaces 14 and 15 are provided with independent DMACs (DMA controllers) 26, 27 and 28, respectively. When data transfer request provided by an interface device is detected, the CPU interface 11 and the DMACs 26, 27 and 28 send bus access request signals (BRs) to the arbiter 17. The arbiter 17 selects one of the bus access request signal senders according to a priority control system and gives a bus access right to the selected bus access request signal sender. The DMAC 28 is a four-channel DMAC. Each channel of the DMAC 28 functions as an independent DMAC. Sometimes, in the following description, the input interface 13 and the I/O interfaces 14 and 15 are referred to inclusively as I/O interfaces 13 to 15.

Figure 2:
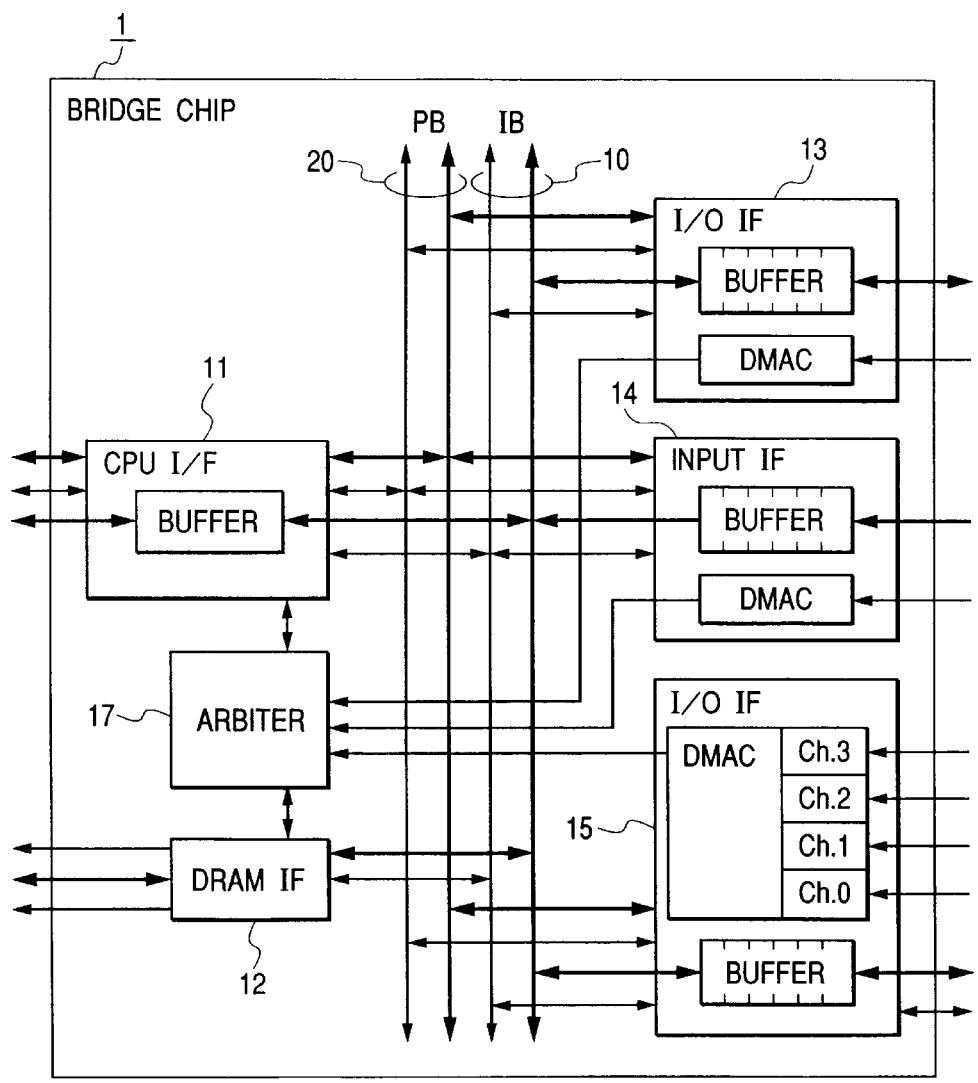
FIG. 2 is a block diagram showing the internal construction of the bridge chip shown in FIG. 1.

FIG. 2 shows the configuration of the bridge chip 1 and the composition of the internal buses of the bridge chip 1. The internal buses are duplicate buses including an internal bus (IB) 10 and a peripheral bus (PB) 20. The peripheral bus 20 is used when the CPU interface 11 gains access to the I/O interfaces 13 to 15.

Figure 3:
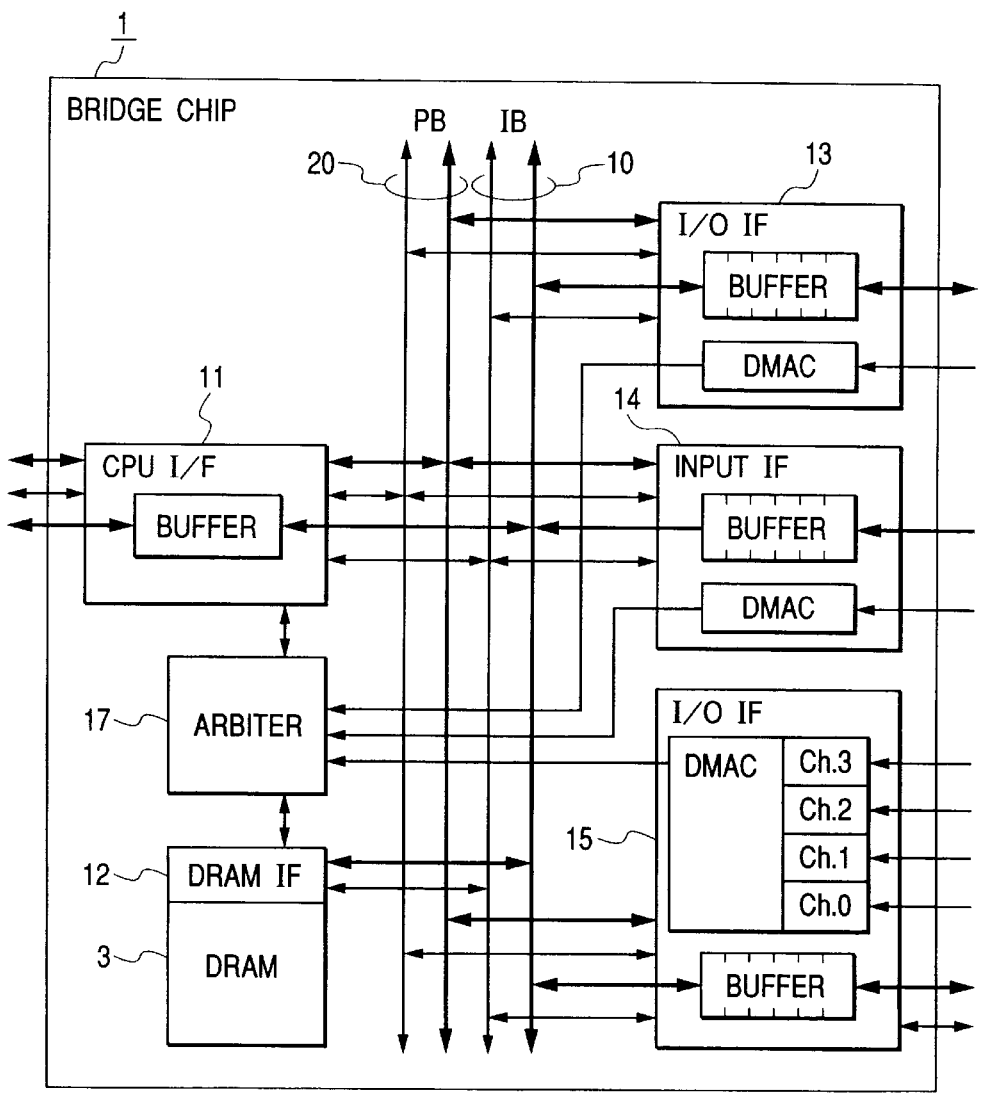
FIG. 3 is a block diagram showing the internal construction of a bridge chip in a second embodiment according to the present invention, in which a DRAM is included in the bridge chip.

A bridge chip 1 in a second embodiment according to the present invention shown in FIG. 3 includes a DRAM 3.

Figure 4:
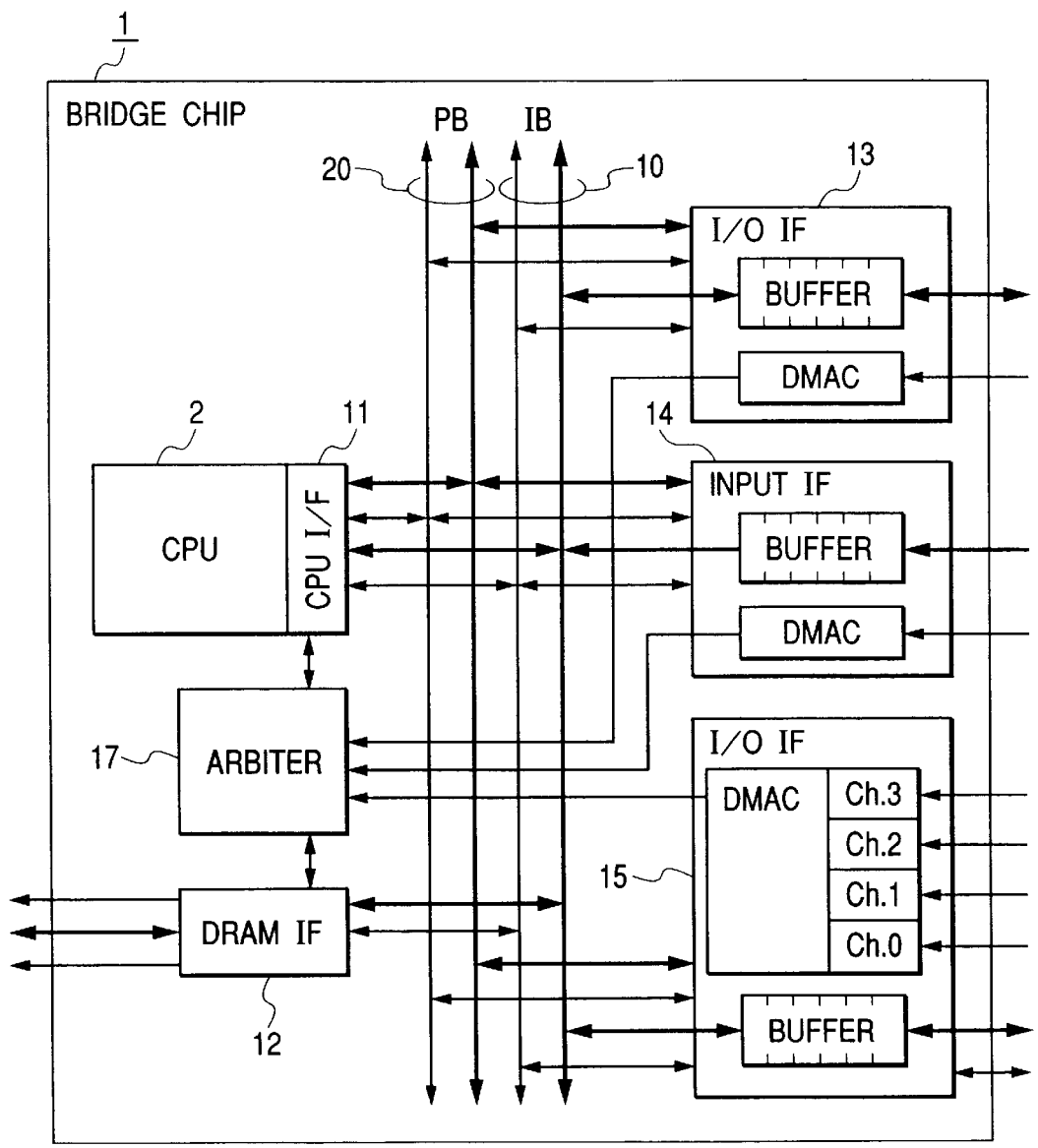
FIG. 4 is a block diagram showing the internal construction of a bridge chip in a third embodiment according to the present invention, in which a CPU is included in the bridge chip.

A bridge chip 1 in a third embodiment according to the present invention shown in FIG. 4 includes a CPU 2.

Figure 5:
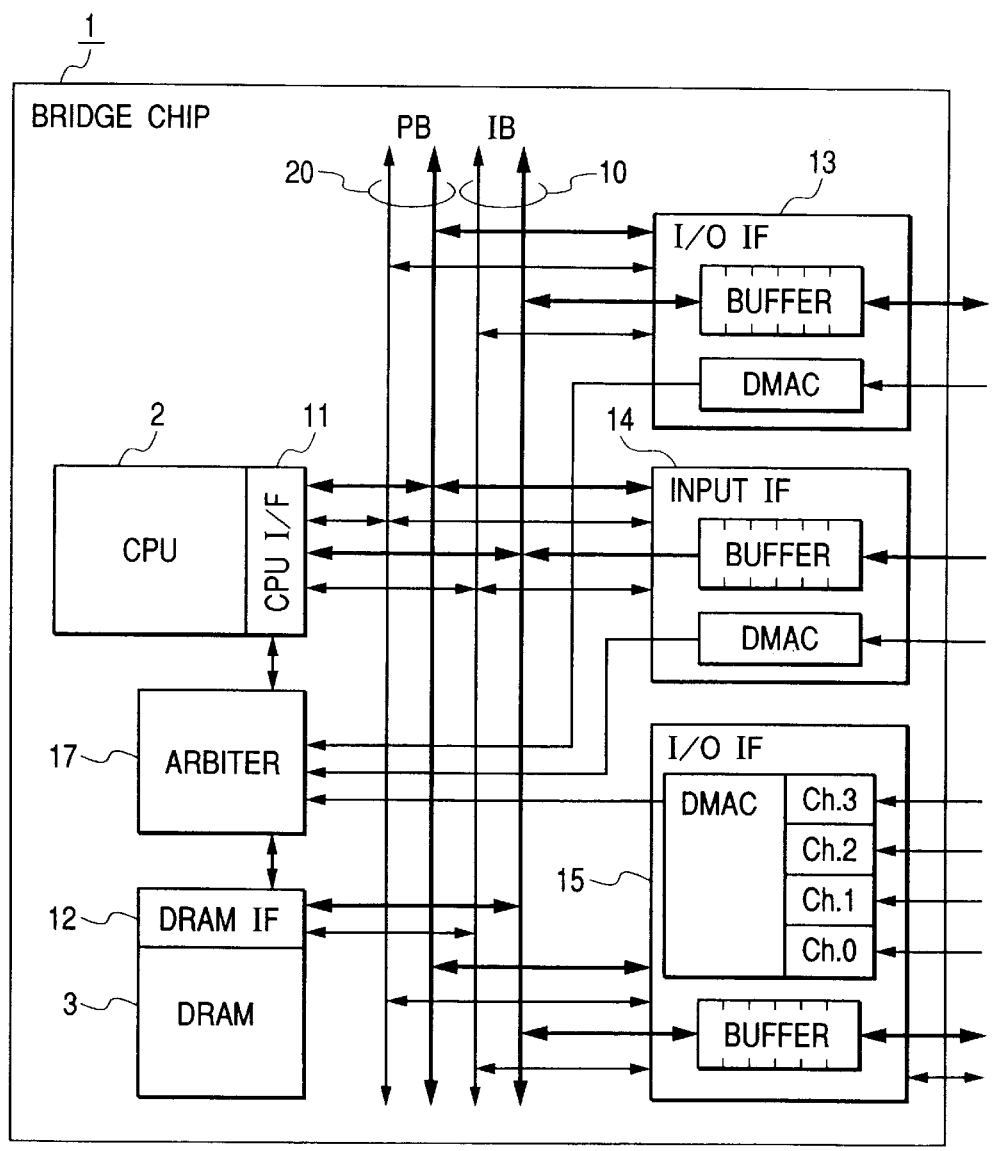
FIG. 5 is a block diagram showing the internal construction of a bridge chip in a fourth embodiment according to the present invention, in which a CPU and a DRAM are included in the bridge chip.

A bridge chip 1 in a fourth embodiment according to the present invention shown in FIG. 5 includes a CPU 2 and a DRAM 3.

Figure 6:
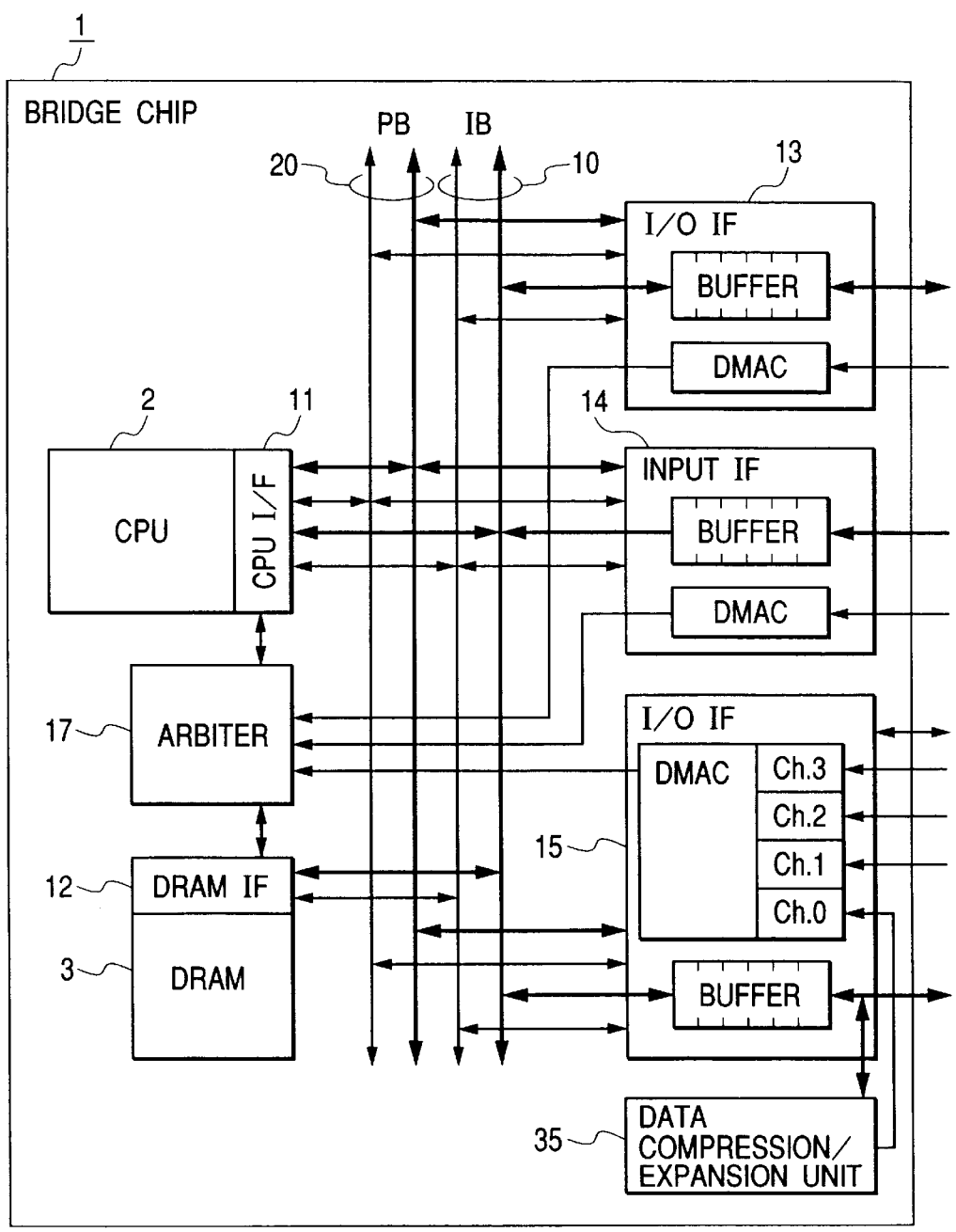
FIG. 6 is a block diagram showing the internal construction of a bridge chip in a fifth embodiment according to the present invention, in which a CPU, a DRAM and a compression/expansion unit are included in the bridge chip.

A bridge chip 1 in a fifth embodiment according to the present invention shown in FIG. 6 includes a CPU 2, a DRAM 3 and a data compression/expansion unit 35. The data compression/expansion unit 35 has the data compressing and expanding functions of the chip 6.

Figure 7:
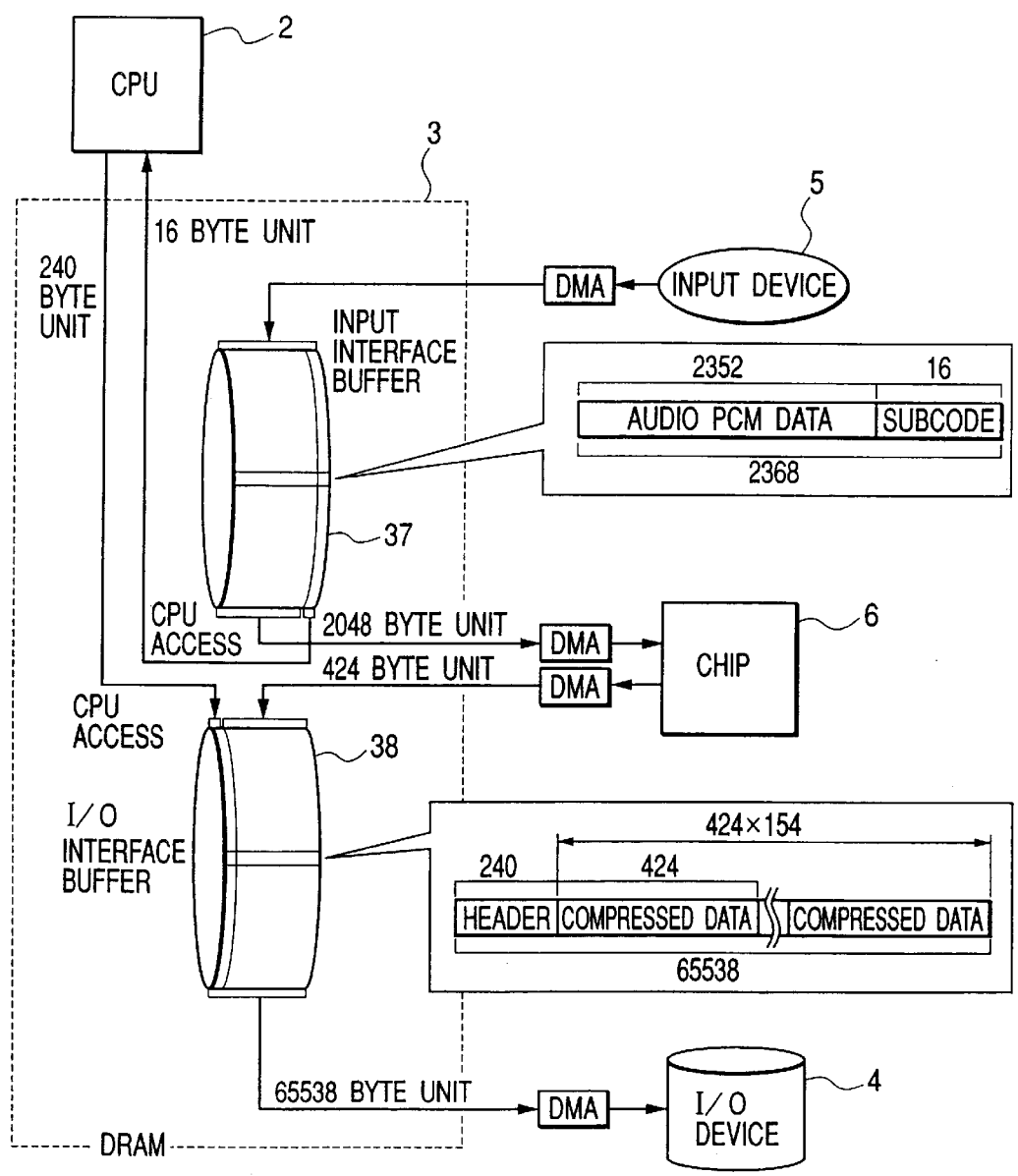
FIG. 7 is a block diagram showing data flow from an input device to an I/O device in a bridge chip with an outline of operation embodying the present invention.

FIG. 7 is a block diagram of assistance in explaining an example of application of the bridge chip 1, particularly showing data flow from the input device 5 to the I/O device 4, and operations of the CPU 2 relating to the data flow. A 16-byte subcode is appended to each 2352-byte audio PCM data stored on the input device 5. The bridge chip 1 transfers by the DMA (direct memory access) method 2368-byte music data read from the input device 5 to an input interface buffer 37 of the DRAM 3 as they are. The CPU 2 directly gains access through the bridge chip 1 to the input interface buffer 37 and analyzes each subcode. The subcodes of the music data on the input interface buffer 37 are skipped and only the PCM data is DMA transferred in units of 2048 bytes to the chip 6 to compress the data by the chip 6. The CPU 2 does not intervene in the data compression. Compressed data is DMA transferred in units of 424 bytes to an I/O interface buffer 38, and every 424×154-byte compressed data is stored in the I/O interface buffer 38 so as to leave a 240-byte header area. Then, the CPU 2 directly gains access through the bridge chip 1 to the I/O interface buffer 38 to store header information in the header area. Finally, the compressed data with header is DMA transferred in units of 65538 bytes from the I/O interface buffer 38 to the I/O device 4 for storage. The input interface buffer 37 and the I/O interface buffer 38 have a buffer configuration called a ring buffer respectively in which data can be written in a wrap-around fashion from the end point of the buffer region toward the start point of the buffer region.

(2) Address Map

Figure 8:
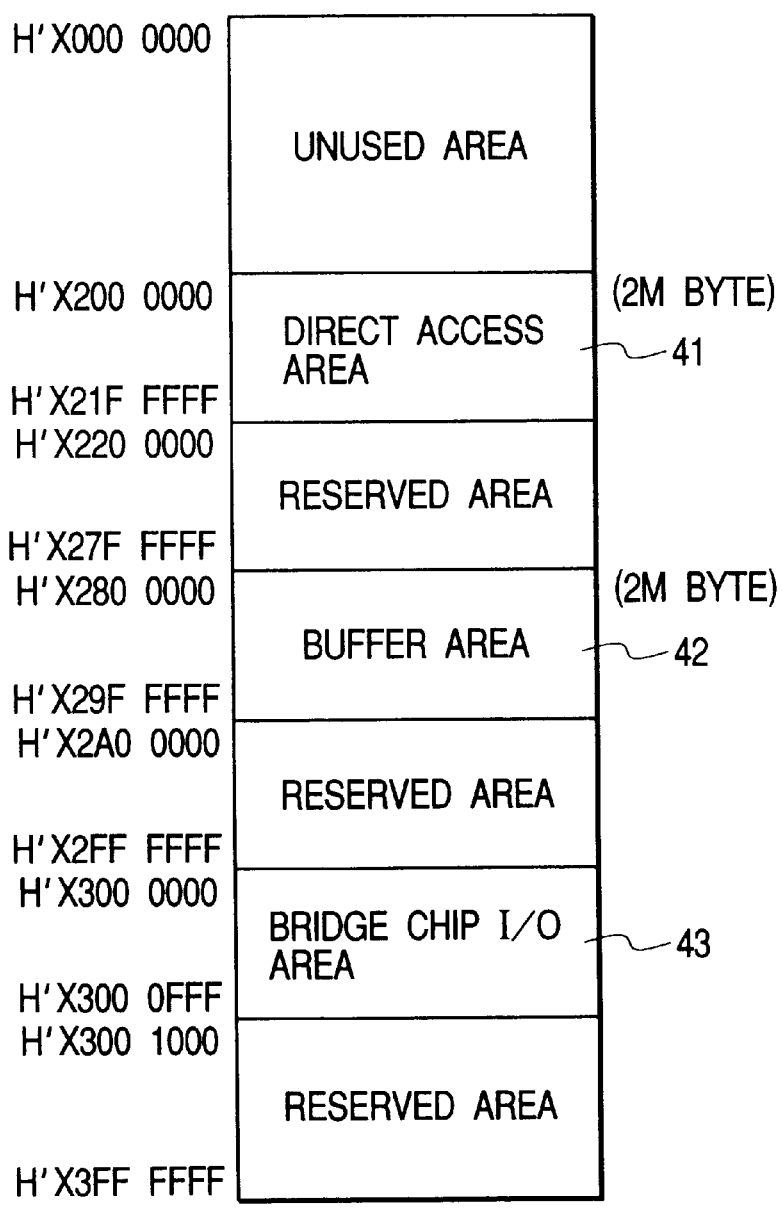
FIG. 8 is a view showing an address map of an address space of the bridge chip embodying the present invention as seen from a CPU.

FIG. 8 shows an address map of an address space of the bridge chip 1 as seen from the CPU 2. A direct access area 41 and a buffer area 42 correspond to areas on the DRAM 3. The CPU 2 uses those areas as ordinary memory areas similar to those of a main memory. The CPU 2 and the I/O interfaces 13 to 15 are able to gain access to the buffer area 42. A bridge chip I/O area 43 corresponds to the control registers for the whole bridge chip 1 and the control registers within the I/O interfaces 13 to 15. The control register as a whole or the I/O interface and its register is identified by the specified address. The internal bus 10 is selected when the CPU 2 or the I/O interfaces 13 to 15 gains access to the areas on the DRAM 3, while the peripheral bus 20 is selected when the CPU 2 gains access to the bridge chip I/O area 43.

Figure 9:
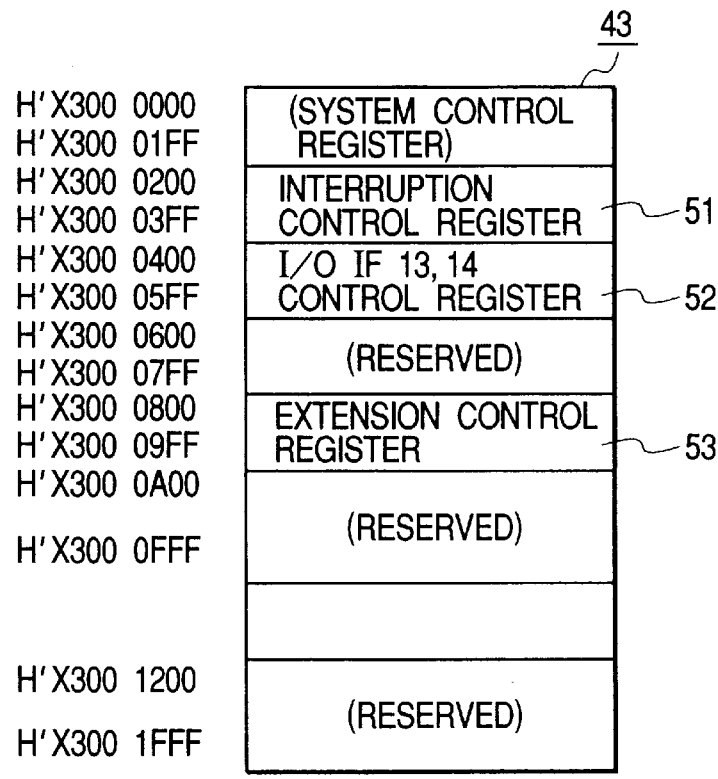
FIG. 9 is a view of a register map of an I/O area in a bridge chip embodying the present invention.

FIG. 9 shows a register map of the bridge chip I/O area 43. An interruption control register 51 is included in the bridge chip 1 to control the interruption to the CPU 2 by the bridge chip 1. Control registers 52 for controlling the I/O interfaces 13 and 14 are included in the I/O interfaces 13 and 14 to control the I/O interfaces 13 and 14, respectively. An extension control register 53 is included in the I/O interface 15 to control data transfer through the extension bus 18, and to control the chip 6 and the external device 7 connected to the I/O interface 15. The control registers 51, 52 and 53 include DMA control registers for controlling the DMACs 26, 27 and 28, respectively.

(3) CPU Interface

The CPU interface 11 is a module for controling data transfer when the CPU 2 gains access through the internal bus 10 to the DRAM 3 and when the CPU 2 gains access through the peripheral bus 20 to the I/O interfaces 13 to 15. The CPU 2 is able to gain access to the DRAM 3 by the following access methods.

(a) A first access method to gain access to the DRAM 3 using the buffer 25

(b) A second access method to gain access to the DRAM 3 bypassing the buffer 25

Figure 10:
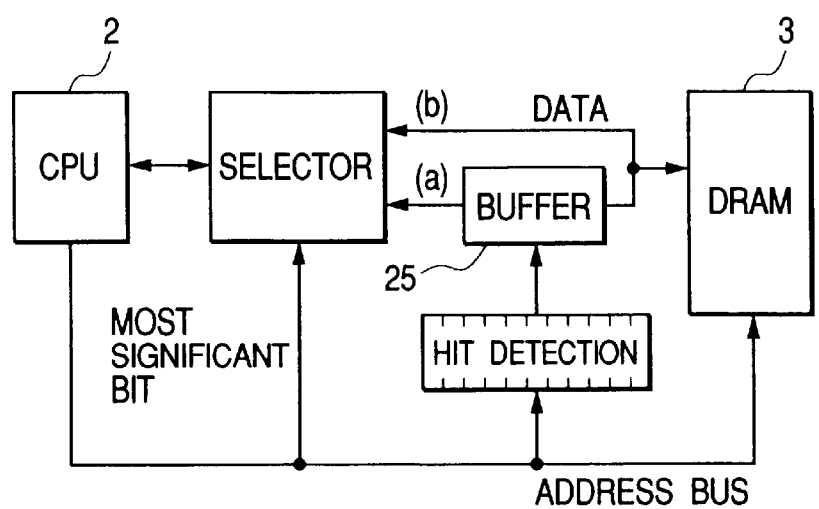
FIG. 10 is a block diagram of assistance in explaining two methods of access by means of a CPU interface included in a bridge chip embodying the present invention.

FIG. 10 is a block diagram of assistance in explaining the two access methods. One of the two access methods is selected according to an address given to the DRAM 3. When the address corresponds to that included in the buffer area 42, the first access method is used to gain access to the DRAM 3. When the address corresponds to that included in the direct access area 41, the second access method is used to gain access to the DRAM 3.

When reading data from the DRAM 3 by the first access method, the CPU interface 11 pre-fetches word data on four consecutive addresses and stores the same in the buffer 25. When the next read access of the CPU 2 hits the addresses of the previously read data, the data stored in the buffer 25 is given to the CPU 2. Thus, memory access without delay can be achieved. When writing data, data on consecutive two words (32 bits) can be written without delay by using the buffer 25 as two alternate buffers. Since the CPU interface 11 stores write data in the buffer 25 while the DRAM 3 is used by DMA transfer by the I/O interfaces 13, 14 and 15, additional wait state is not caused. High-speed data transfer between the CPU 2 and the DRAM 3 is possible by using the buffer 25. However coherency that is caused by DMA transfer etc in the bridge chip 1 must be taken into consideration.

As mentioned above, the bridge chip 1 has the duplicate internal buses and hence the CPU 2 can gain access to the control registers of the I/O interfaces 13, 14 and 15 while the I/O interfaces 13, 14 and 15 are in data transfer by DMA. An interface between the CPU 2 and the bridge chip 1 conforms to the interface of a SRAM.

(4) Interruption Control

The bridge chip 1 controls external interrupt given to the CPU 2. The bridge chip 1 is connected to the CPU 2 by interrupt lines (IRL3 to 0). The bridge chip 1 encodes fourteen interrupt factors caused by the same into 4-bit interrupt codes and gives the 4-bit codes to the CPU 2. The interrupt factors include those relating to the I/O interfaces 13, 14 and 15, the chip 6 and the external device 7.

TABLE 1

| Address | Name of Register |
| --- | --- |
| H'X300 0200 | Interrupt mask register (IMR) |
| H'X300 0202 | Interrupt priority level register (IRLR) |

Table 1 shows registers for interruption control.

The interrupt mask register (IMR) sets a mask bit to each interrupt factor. The interrupt priority level register (IRLR) is a 2-bit priority pattern bit and divides the interrupt priority levels of the fourteen interrupt factors into three patterns. The bridge chip 1 decides the priority levels of the interrupt factors according to the priority pattern bits set in the IRLR. Since the priority levels are classified into three kinds, hardware volume of the bridge chip 1 can be reduced. Three patterns are shown by way of example in Table 2. Levels 15 to 1 include one level which is not used.

TABLE 2

| Level | Pattern 1: IRLR = '00' | Pattern 2: IRLR = '01' | Pattern 3: IRLR = '10' |
| --- | --- | --- | --- |
| 15 | IF13 (Input device) | External device 7 | IF13 (Input device) |
| 14 | IF14 (I/O device) | IF13 (Input device) | IF14 (I/O device) |
| 13 | Chip 6 | IF14 (I/O device) | Chip 6 |
| 12 | . | . | DMAC (IF13) |
| . | . | . | DMAC (IF14) |
| . | . | . | . |
| 1 | . | . | . |
| Remarks | Priority to device | Priority to extension bus | Priority to high-speed copy |

(5) DRAM Interface

The DRAM interface 12 controls data transfer between the CPU interface 11 and the I/O interfaces 13, 14 and 15, and the DRAM 3 in response to access request given thereto through the internal bus 10 by the CUP interface 11 and the I/O interfaces 13, 14 and 15. The CPU 2 gains direct access to an area in the DRAM 3 corresponding to the access area 41 or the buffer area 42. The I/O interfaces 13, 14 and 15 gain access to an area in the DRAM 3 corresponding to the buffer area 42. The DRAM interface 12 transmits 8-word data by high-speed data transfer based on a burst transmission mode. Byte access control is feasible in a write cycle. The DRAM interface 12 executes byte access control through mask control. The DRAM interface 12 inserts a refresh pulse twice in 512 memory cycles by a refresh counter 31.

(6) DMACs

The DMACs 26, 27 and 28 control data transfer between the I/O interfaces 13, 14 and 15 and the DRAM 3, respectively. DMA data transfer operates in a single-address mode. The I/O interfaces 13, 14 and 15 are provided with the read/write buffers 21, 22 and 23, respectively, to achieve high-speed data transfer between the I/O interfaces 13, 14 and 15 and the DRAM 3. The sizes of the read/write buffers 21, 22 and 23 are equal to the respective transfer units of the I/O interfaces 13, 14 and 15, respectively, such as 16 bits x4, x8, X16, . . . . In this embodiment, data is transferred in units of word (16 bits) and it is possible to transfer continuously 1,048,576 words at the maximum by using a 20-bit register that sets the number of words to be transferred. A data area in the buffer area 42 is divided into a transferring area and a non-transferring area, and data transfer of the non-transferring area can be skipped by specifying the length of the non-transferring area as an offset. If the offset is a naught, ordinary continuous transfer is carried out. The DMAC 28 is a 4-channel DMAC. The bridge chip 1 has six channels including the four channels of the DMAC 28 and those of the DMACs 26 and 27. The DMAC 28 accepts independent data transfer requests through the four channels.

Each DMAC is provided with a DMA control register for each channel. The specification of the DMA control registers is the same over all the channels.

DMA control/status register (CSR)

DMA memory address registers (MARU, MARL)

DMA transfer count registers (TCRU, TCRL)

DMA sequential access word count register (SWR)

DMA offset word count register (OWR)

FIGS. 11A and 11B shows the respective configurations of the DMA control registers. In FIGS. 11A and 11B, "R" indicates that only a read operation is possible and "R/W" indicates that both read and write operations are possible.

(a) DMA Control/Status Register (CSR)

The CSR carries out control operations for controlling start and forced termination of the DMAC. The CSR is used also as status flags indicating the control of the occurrence of interrupt after the termination of DMA transfer and a status where DMA is being executed.

SR: Software Reset (R/W)

A bit SR indicates the forced termination of DMA. When this bit is set by "Write 1", DMA transfer is stopped and a DE bit is cleared to "0". At this time, an INT bit does not go "1". The SR bit is initialized by "Write 0" or reset operation.

EXTREQ: EXT DREQ Monitor Bit (R)

This bit is a monitor bit for monitoring an external DMAREQ signal to detect the locking of an external DMAREQ due to some cause (for example, a state with a pending request). An initial value is dependent on an external device.

R/W: Read/Write (R/W)

This bit indicates a direction of data transfer.

1: Data is read from DRAM and the data is transferred to the I/O device.

0: Data is read from the I/O device and the data is transferred to the DRAM.

INTE: Interrupt Request Enable (R/W)

This bit indicates whether an interrupt request is given to the CPU upon the termination of DMA transfer. When the INTE bit is set by "Write 1", the INTE bit is set upon the termination of DMA transfer to make a request to the CPU for interrupt.

INT: Interrupt Request (R/W)

When a predetermined DMA transfer operation is completed, this bit is set to "1" to request to the CPU for interrupt. This bit needs to be reset by "Write 0" by interrupt processing.

DE: DMA Enable (R/W)

This bit indicates DMA transfer enable. When the DE bit is set by "Write 1", transfer is started. During DMA transfer, the DE bit is held at "1" and is cleared to "0" after a predetermined data transfer operation has been completed. This bit is used as a status flag indicating that DMA is being executed.

(b) (c) DMA Memory Address Register (MARU, MARL)

A DMA memory address register is a 21-bit read/write register that indicates the starting address of a memory for DMA transfer. Since data is transferred in a unit of word, MA0=0.

(d) (e) DMA Transfer Count Register (TCRU, TCRL)

A DMA transfer count register is a 20-bit read/write register that indicates DMA transfer word count by setting a value of number of transfer words "−1". For example, the DMA transfer count register is set by "Write H'F (15)" when transferring sixteen words.

(f) DMA Sequential Access Word Count Register (SWR) A DMA sequential access word count register is a 16-bit read/write register that indicates the number of words of a transfer area to which sequential access is made. Set value is "Sequential access word count−1". In this transfer area, the memory address is updated every word (+2 bytes). The DMA sequential access word count register is used in combination with a DMA offset word count register (OWR), which will be described later.

(g) DMA Offset Word Count Register (OWR)

A DMA offset word count register is a 12-bit read/write register that indicates the number of words of the non-transferring area to be skipped. The number of words is set in a unit of one word. After the transfer of data in the transferring region has been completed, "an offset" specified by the OWR is added to the next memory address, and then sequential access to the transferring area is made. Entire sequential access is made when this register is "Set to 0".

Figure 12:
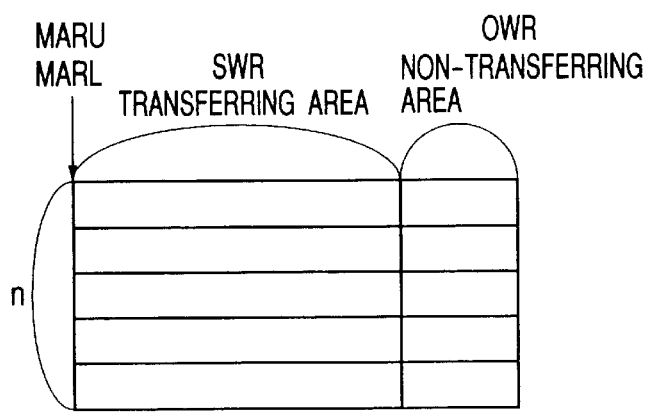
FIG. 12 is a diagrammatic view of assistance in explaining an offset function of a bridge chip embodying the present invention.

FIG. 12 is a diagrammatic view of assistance in explaining an offset function of the bridge chip 1. MARU combined with MARL is a data transfer start address in a MAR. A data section has a transferring area and a non-transferring area, and data has n data sections. The number of words in the transferring area is set in the SWR, and the number of words in the non-transferring area is set in the OWR. The number of total words to be transferred is set in the TCR is the number of words to be actually transferred, which is equal to (SWR)×n. After transferring data in the transferring area, the DMAC adds the number of words set in the OWR to the transfer address and skips the non-transferring area. When an offset function is applied to, for example, reading music data from the input device 5 and transferring only the PCM data among those stored in the DRAM 3, the non-transferring area can be skipped.

Figure 13:
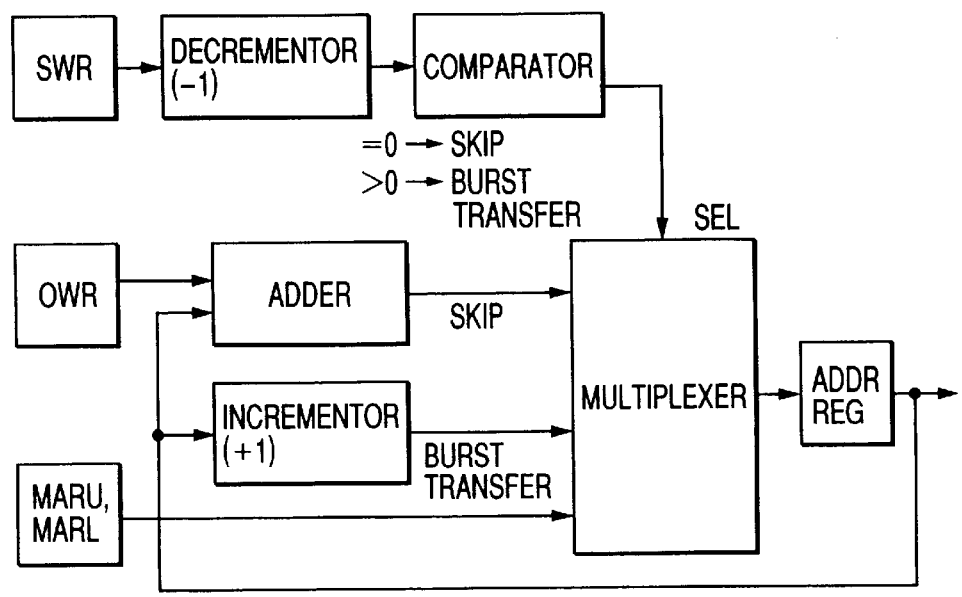
FIG. 13 is a block diagram of assistance in explaining a skip function of a bridge chip embodying the present invention.

FIG. 13 is a block diagram of assistance in explaining the skip function. The skip function can be controlled by generating DMA address. During ordinary continuous operation, the DMA address is incremented by an incrementer by +1 at a time. After the termination of the continuous transfer of an area specified by the SWR, the skip action adds a value set in the OWR to a value set in an address register storing the last transferred address. Therefore, the next data transfer can skip the non-transferring area and can indicates the address of effective data.

FIG. 14 is a diagrammatic view of assistance in explaining data transfer by the DMAC. FIG. 14 illustrates a data transfer operation among a series of processing operations for reading PCM data from the input device 5, converting the PCM data by the chip 6 and recording data provided with header information in the I/O device 4.

FIG. 14(*a*) is a view of assistance in explaining a data transfer operation for transferring data from the input device 5 to the DRAM 3. When reading PCM data with subcode from the input device 5 and storing the same in the DRAM 3, the OWR is set to "0" and the TCR is set to a transfer word count of [(2368 bytes×n/2)−1]. Then, data corresponding to (the number of words set in the TCR) +1 is transferred sequentially from the memory address set in the MARU and the MARL to the DRAM 3.

FIG. 14(b) is a view of assistance in explaining data transfer operation for transferring data stored in the DRAM 3 to the chip 6 for data compression. In this case data is transferred to the chip 6 after removing a 16-byte subcode. A number of words so 16/2 is set in the OWR and a transfer word count of [(2352 bytes×n/2)−1] is set in the TCR. As a result, the operation of data transfer of 2352/2 word data which is stored in the DRAM 3 according to the word count set in the SWR followed by skipping the 16/2 word subcode is repeated n times. A transfer termination address is at a data position indicated in FIG. 14(b).

FIG. 14(c) is a view of assistance in explaining data transfer operation for transferring data in a form of 64k-byte cluster to the DRAM 3 to record data converted by the chip 6 in the I/O device 4. A header information area of 240 bytes is added to one cluster to form a cluster of 65,538 bytes. A value of 240/2 is set in the OWR, a value of (424×154/2)−1 is set in the SWR, (65,538 bytes×n/2)−1 bytes is set in the TCR, and an actual data transfer start address shifted by the header information area is set in the MAR. Thus a 240-byte header information area can be secured in each cluster and data is transferred from the chip 6 to the DRAM 3 according to the number of words set in the TCR.

FIG. 14(d) is a view of assistance in explaining a data transfer operation of the CPU 2 to gain direct access to the DRAM 3, to store header information in the areas of the DRAM 3 and to transfer data from the DRAM 3 to the I/O device 4. Supposing all the data including the header is transferred, a value "0" is set in the OWR and (65,538 bytes×n/2)−1 is set in the TCR. Data is transferred from the DRAM 3 to the I/O device 4 according to the number of words set in the TCR.

Although skip transfer has been described, data can be similarly transferred even if the compressing method is changed. For example, when a compressing method called MP3 (MPEG1 audio layer3) is used, data is processed in a unit of 4608 bytes, the size of the compressed data is 420 bytes, which can be dealt with only by changing the set values of the registers.

When a DVD storing image data and music data is used, the registers may be set so as to skip the image data and subcodes and to transfer only the music data.

(7) I/O Interfaces 13 and 14

An I/O device conforming to the ATA-3 standard can be connected to each of the I/O interfaces 13 and 14. A rule of timing access to an external device conforms to PIO Mode 4 and DMA Mode 2. The I/O interfaces 13 and 14 are provided, respectively, with the read/write buffers 21 and 22 and realize high-speed data transfer from and to the DRAM 3. The I/O interfaces 13 and 14 are provided, respectively, with the DMACs 26 and 27 and execute commands received from the CPU 2 independently. The I/O interfaces 13 and 14 are provided, in addition to the DMA control registers, with special I/O control registers mapped on the address space.

Figure 15:
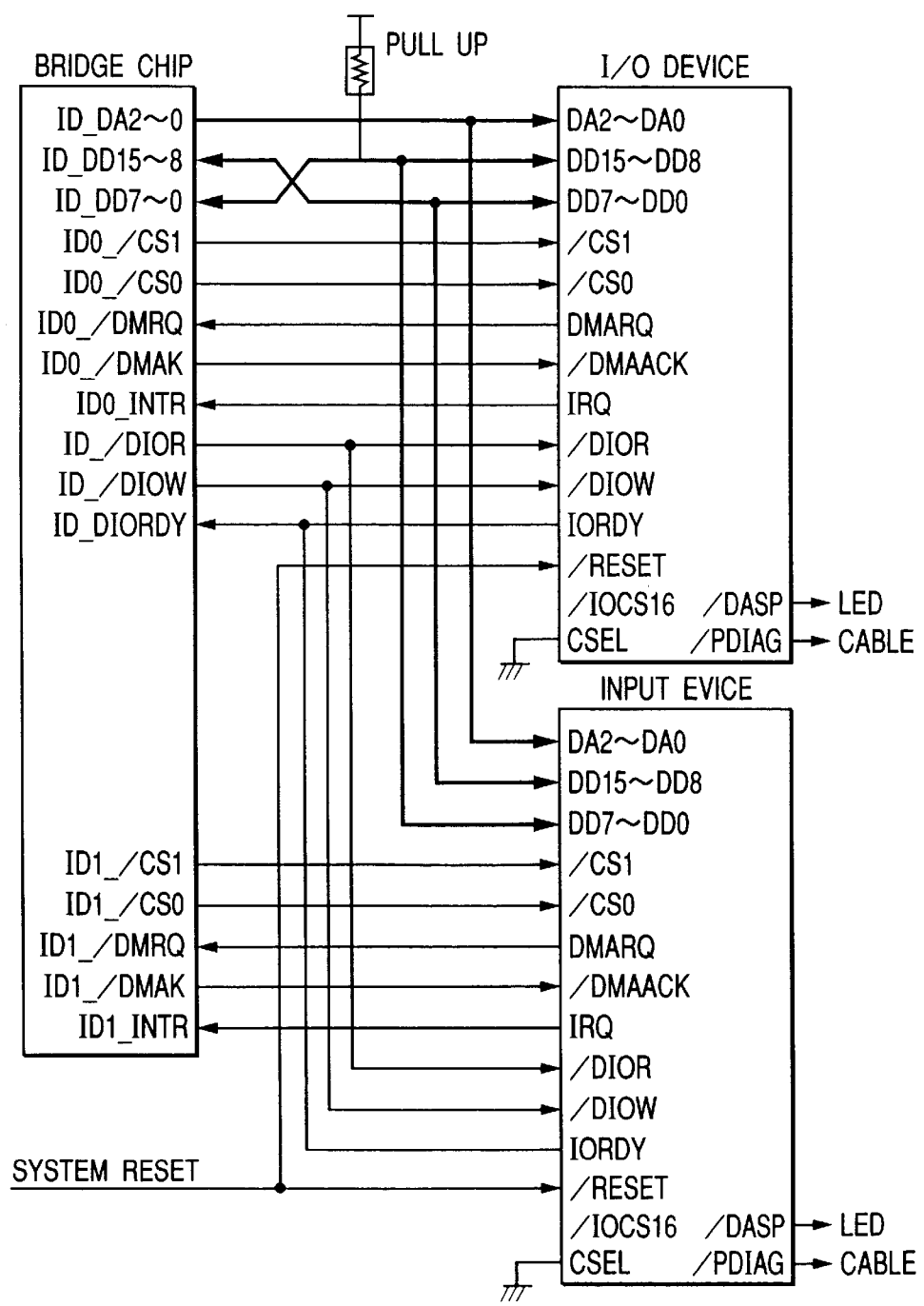
FIG. 15 is a block diagram showing the connection of a bridge chip embodying the present invention and ATA apparatus.

FIG. 15 illustrates a method of connecting the bridge chip 1 to ATA apparatuses. The access to the I/O control registers of the I/O interfaces 13 and 14 is made by words (16 bits). Pull-up is executed to avoid high-order bytes (DD15 to DD8) becoming indefinite. DD15 to DD8 of the I/O device and DD7 to DD0 of the input device are connected to DD7 to DD0 of the bridge chip 1, and DD7 to DD0 of the I/O device and the DD15 to DD8 of the input device are connected to the DD15 to DD8 of the bridge chip 1. This method of connection enables only the I/O device to convert endian. Since each of the I/O device and the input device is provided with /CS0, /CS1, DMARQ, /DMAACK and IRQ, either of the I/O device and the input device is able to serve as a master.

(8) Extension Bus Interface

The chip 6 and an I/O device conforming to the extension bus interface are connected to the extension bus 18. The I/O interface 15 is provided with the read/write buffer 23 for DMA transfer between the internal bus 10 and the extension bus 18 to realize high-speed data transfer. Data is transferred in a unit of two words (32 bits) between the internal bus 10 and the extension bus 18 for efficient data transfer. The CPU makes access in a unit of one word. The I/O interface 15 is provided with the 4-channel DMAC 28. The DMA control registers and the data transfer registers for the extension bus mapped on the address space are provided for each channel. The I/O control registers mapped on the address space is provided specially for each I/O device connected to the extension bus 18.

Figure 16:
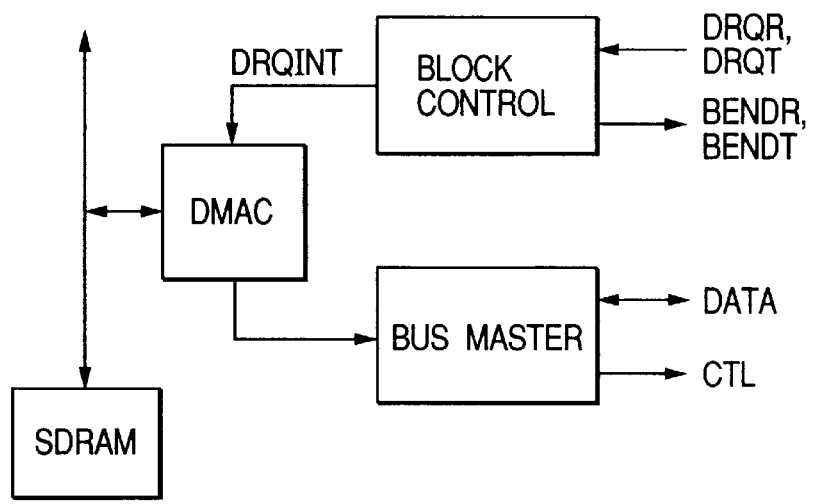
FIG. 16 is a block diagram of assistance in explaining operations of a bridge chip embodying the present invention for block transfer and data compression.
Figure 17:
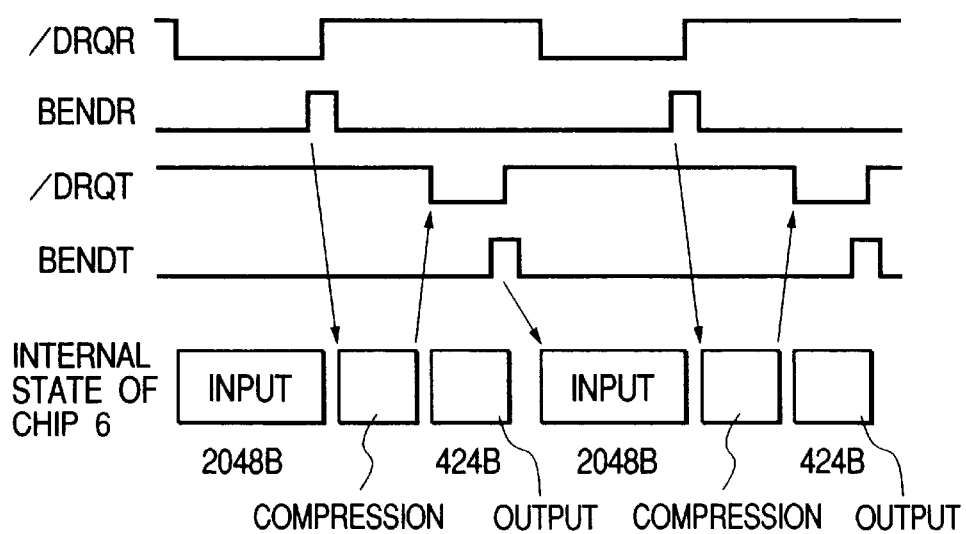
FIG. 17 is a timing diagram of assistance in explaining operations of a bridge chip embodying the present invention for block transfer and data compression.

FIG. 16 is a block diagram of assistance in explaining operations of the bridge chip 1 for block transfer and data compression and FIG. 17 is a timing diagram of assistance in explaining those operations of the bridge chip 1. The chip 6 that compresses data makes a data input request after internal preparation has been completed and asserts a /DRQR signal to be LOW level. Upon the reception of the data request signal, the DMAC of the bridge chip 1 sends out data. After the completion of transferring the data of a predetermined block size (for example, 2048 bytes), a block transfer end signal BENDR is asserted to notify the chip 6 of the end of data transfer. Subsequently, the chip 6 starts a data compressing process. Upon the completion of the data compressing process, the chip 6 makes a data output request and asserts a /DRQT signal to be LOW level. Upon the reception of the data output request signal, the bridge chip 1 receives the compressed data. After the compressed data of a predetermined block size (for example, 424 bytes) has been received, the bridge chip 1 asserts BENDT and informs the chip 6 of the completion of transfer. Those operations are repeated thereafter.

TABLE 3

| Address | Resisters |
| --- | --- |
| H'X300 0850 | Block control register (BLCTL) |
| H'X300 0852 | Block length specifying register (BLLEN) |
| H'X300 0854 | High-order block count status register (BLCNTSU) |
| H'X300 0856 | Low-order block count status register (BLCNTSL) |

Table 3 shows exclusive data transfer registers common to all the channels.

FIG. 18 shows data construction in the exclusive data transfer registers. R/W signifies the same meaning as that mentioned above.

(a) Block Control Register (BLCTL)

The DMAC 28 of the I/O interface 15 has, in addition to a common DMAC function, block transfer functions suitable for the chip 6, which are different from those of the DMACs of the other I/O interfaces. The block control register is a register to control the block transfer functions.

The block transfer functions added to the common DMAC function include the following functions.

(1) Data is divided into blocks to be transferred block by block. After the end of transferring the data of a specified block size, a block transfer end (BENDX) signal is asserted to the chip 6 and suspends (breaks) data transfer temporarily.

(2) Transferred Block Counting Function

CLBC: Clear Block Transfer Counter

During DMA transfer, an internal circuit of the I/O interface 15 counts the number of transferred data in the block of data to be transferred. The CPU 2 is unable to read the count. This bit is used to clear the count when data transfer is interrupted. When clearing the count, the CLBC bit is set by "Write 1". The CLBC bit is reset by "Write 0" to restart the counter.

CLBL: Clear Block Counter

A CLBL bit clears the register (BLCNTS) of a block counter that counts the number of blocks transferred from or to the chip 6. When clearing the count, the CLBL bit is set by "Write 1" and is reset by "Write 0" to restart the counter.

(b) Block Length Specifying Register (BLLEN)

A block length specifying register is a 16-bit read/write register. The block length specifying register specifies the number of words to be transferred for one block. The number of words to be transferred is specified in a unit of long words (32 bits). Therefore, the least significant bit is always "0". The contents of this register cannot be updated except on reset operation.

(c) (d) Block Count Status Register (BLCNTSU, BLCNTSL)

A block count status register is a 24-bit status register that counts transferred blocks. This register is a read-only register. A clearing of the counter is controlled by the CLBL bit of the block control register (BLCTL).

Figure 19:
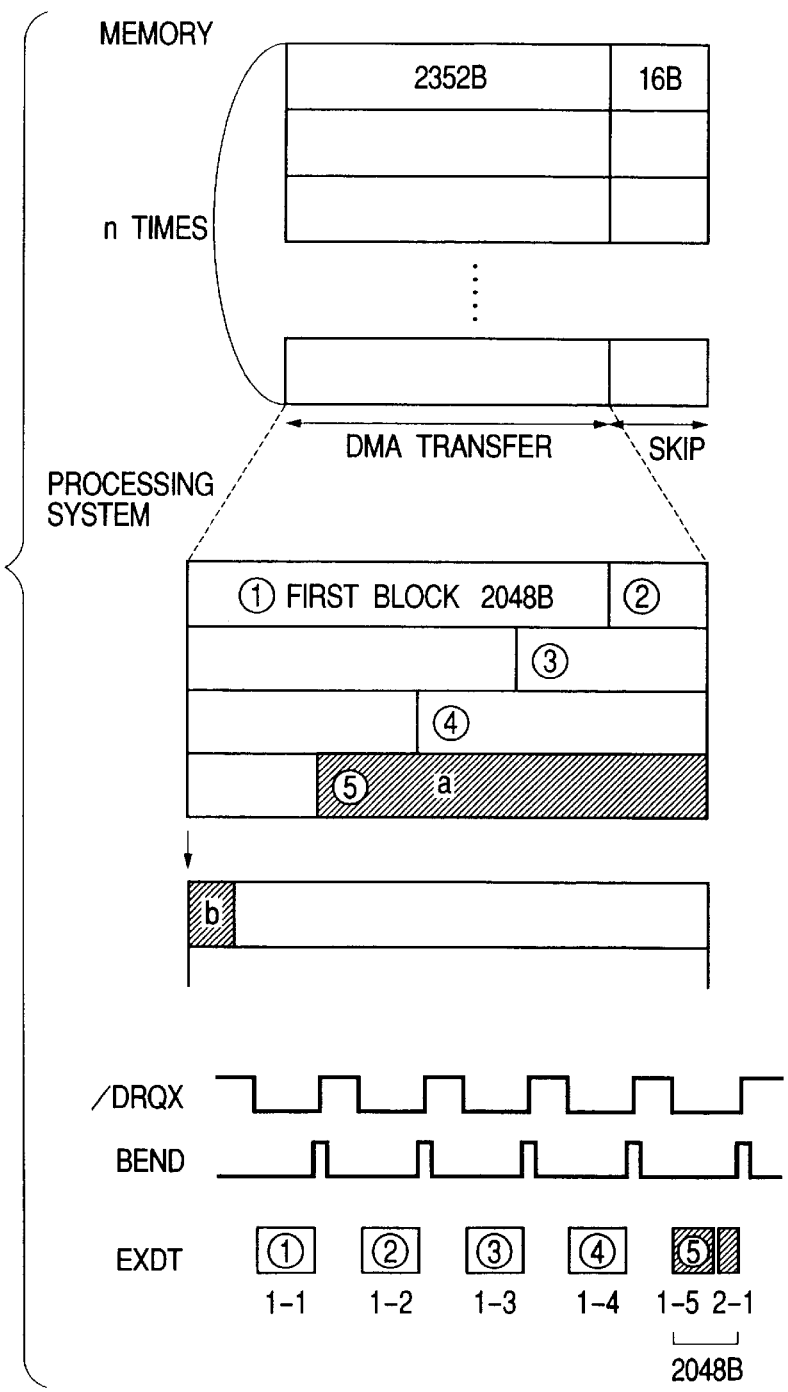
FIG. 19 is a diagrammatic view of assistance in explaining the relation between block transfer and DMA transfer.

The block transfer operation will be explained. FIG. 19 is a view of assistance in explaining the relation between block transfer and DMA transfer. In general, audio data on the input device, for example, has 2352-byte PCM data and 16-byte subcode stored in one sector. When transferring the PCM data from the input device to a memory connected to the bridge chip, a multiple of 2352 byte sector is fetched in a batch. Since data compression processes, for example, 2048 bytes in a unit, 2352 bytes has a fraction when 2048 bytes are processed in a unit. Therefore, DMA transfer is ended before the entire block is transferred. Since the fraction is continuous with the next sector, the head of the next batch data must be sent continuously within the same block.

Figure 20:
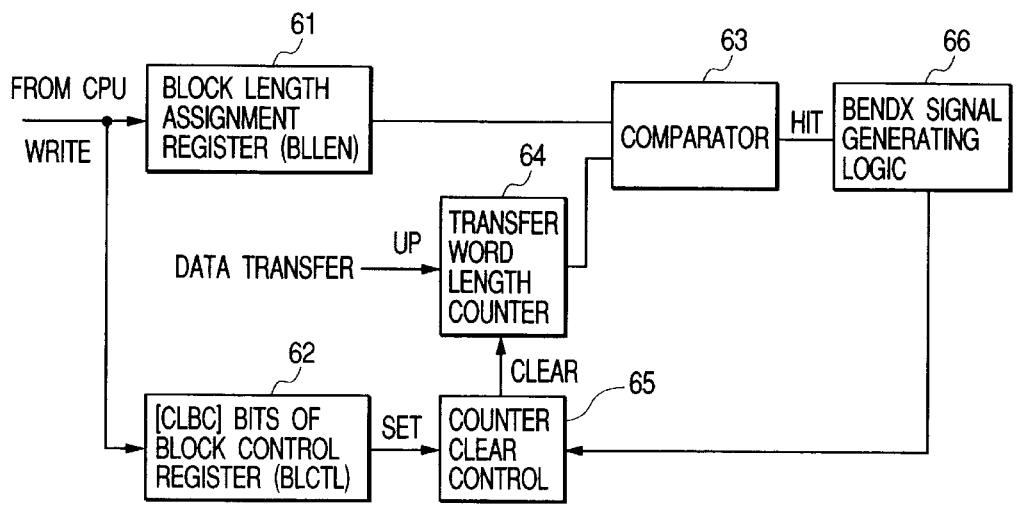
FIG. 20 is a block diagram of assistance in explaining a block transfer operation by means of a BLLEN included in a bridge chip embodying the present invention.

FIG. 20 is a block diagram of assistance in explaining a block transfer operation by the BLLEN. After a transferred word length counter 64 included in the I/O interface 15 has been cleared, a block transfer signal (/DRQX) is given to the bridge chip 1 to actuate the bridge chip 1 and a data transfer operation is started. The transferred word length counter 64 counts up the number of words transferred. A comparator 63 compares a value specified by a BLLEN 61 and the contents of the transferred word length counter 64. Upon the coincidence of the value specified by the BLLEN 61 and the contents of the transferred word length counter 64, a block transfer end (/BENDX) signal generating logic 66 generates a BENDX, and a counter clear control 65 is actuated to clear the transferred word length counter 64. When canceling the data transfer operation before the entire block is transferred, the CPU 2 sets the CLBC bits 62 of the BLCTL. Then, the counter clear control 65 is actuated to clear the transferred word length counter 64.

Figure 21:
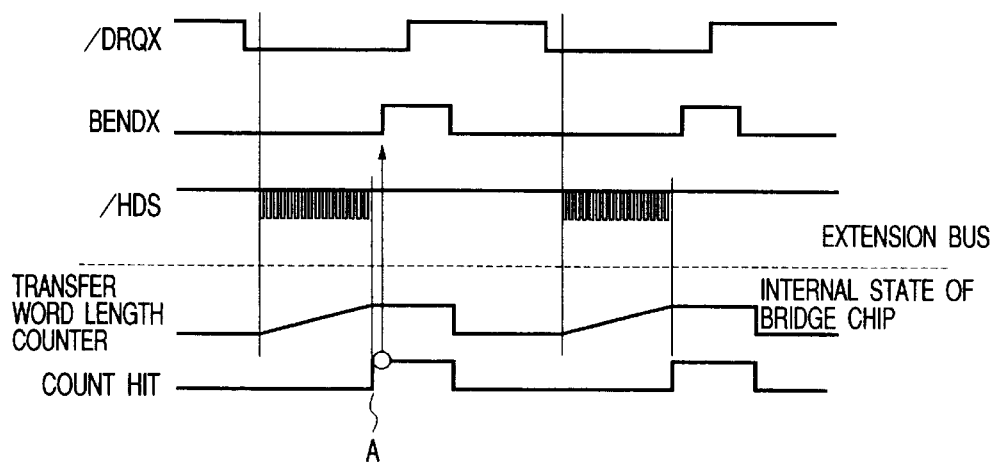
FIG. 21 is a timing diagram of assistance in explaining a block transfer operation of a bridge chip embodying the present invention.

FIG. 21 is a timing diagram of assistance in explaining the block transfer operation. As data transfer between the extension bus 18 and the I/O interface 15 proceeds, the transferred word length counter 64 counts up. At a point A where the value of transferred word length counter 64 reaches the value specified by the BLLEN 61, BENDX goes HIGH. Then, the transferred word length counter 64 is cleared and the block transfer operation is repeated for the next block transfer cycle. In FIG. 21, /HDS indicates a data strobe signal between the bridge chip 1 and the extension bus 18.

Figure 22:
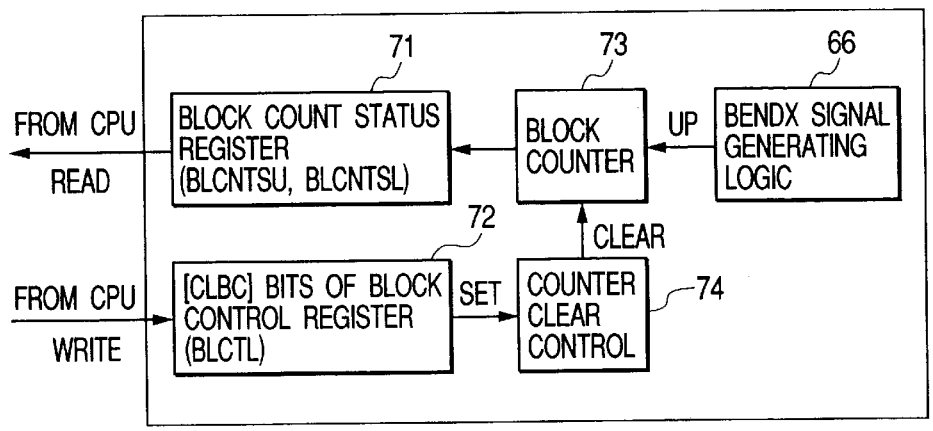
FIG. 22 is a block diagram of assistance in explaining a block counting operation of a bridge chip embodying the present invention.

FIG. 22 is a block diagram of assistance in explaining a block counting operation of the bridge chip 1. Every time the transfer of a block is completed, the BENDX signal generating logic 66 generates a BENDX signal, a block counter 73 included in the I/O interface 15 counts up and a BLCNTS 71 is updated by a value of the block counter 73. The CPU 2 is able to read a count value of the BLCNTS 71. When the CLBL bit 72 of the BLCTL is set by the CPU 2, a counter clear control 74 is actuated to clear the block counter 73. Consequently, the BLCNTS 71 is cleared.

Figure 23:
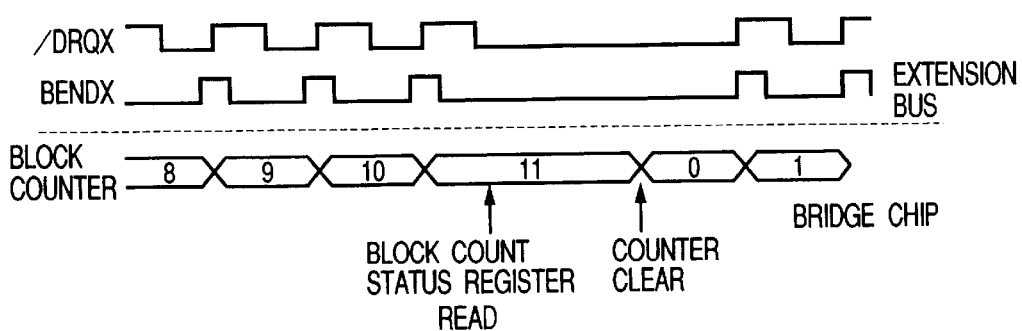
FIG. 23 is a timing diagram of -assistance in explaining a block counting operation of a bridge chip embodying the present invention.

FIG. 23 is a timing diagram of assistance in explaining a block counting operation of the bridge chip 1. After the count value of the BLCNTS 71 has been read, the block counter 73 and the BLCNTS 71 are cleared. Then, the transfer of the eleventh block is regarded as that of the 0th block.

Figure 24:
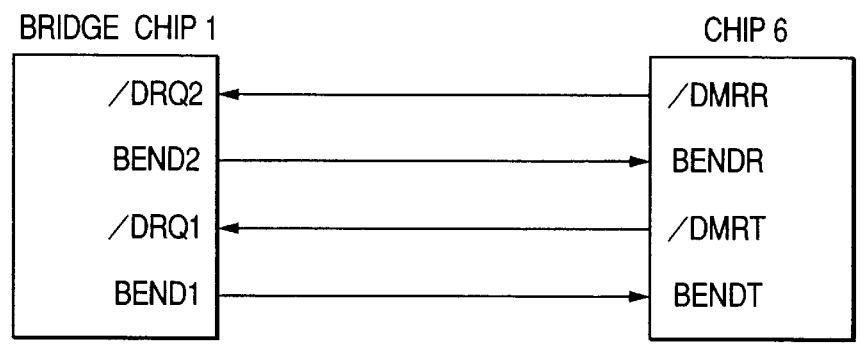
FIG. 24 is a diagrammatic view showing signals relating to data transfer between a bridge chip embodying the present invention and another chip.

FIG. 24 is a diagrammatic view showing signals relating to data transfer between the bridge chip 1 and the chip 6. A data transfer protocol uses a transfer request (/DRQX) signal and a transfer end (/BENDX) signal for data transfer. Symbol "R" at the end of the names of signals on the side of the chip 6 indicates that the chip 6 serves as a receiver and symbol "T" at the end of the same names indicates that the chip 6 serves as a transmitter.

Figure 25:
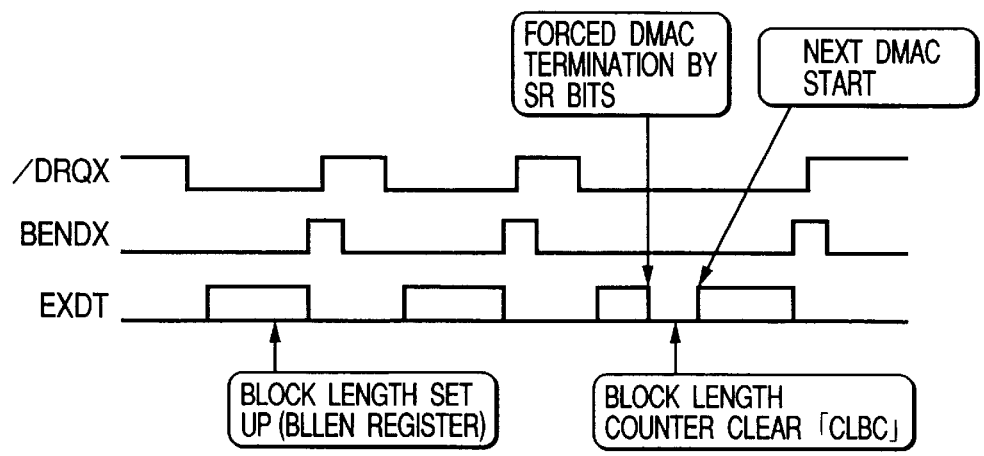
FIG. 25 is a timing diagram of assistance in explaining a block transfer operation using an extension bus.

FIG. 25 is a timing diagram of assistance in explaining a block transfer operation using the extension bus 18. In the DMA transfer protocol, /DRQX is asserted on condition that it goes LOW. Upon the end of block transfer, BENDX is asserted, /DRQX is negated as a result and BENDX is negated by the transmission of this signal in the sequence.

A conversion unit of 2048 bytes used by the chip 6 is set as a block transfer length in the BLLEN. In the case shown in FIG. 25, DMAC is ended forcibly during block transfer by a software reset (SR) bit. When starting DMAC again, the block counter is initialized by the CLBL of the block control register when necessary. In FIG. 25, EXDT is a signal transmitted through a data line between the bridge chip 1 and the extension bus 18.

Figure 26:
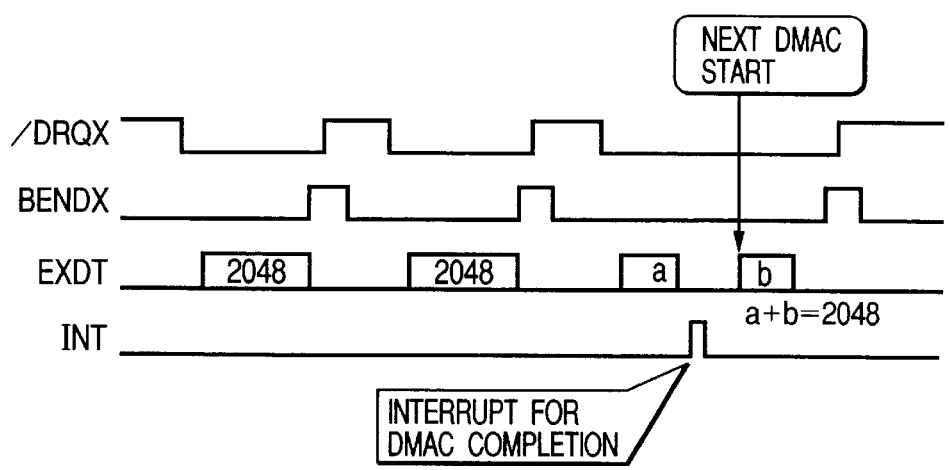
FIG. 26 is a timing diagram of assistance in explaining operations for interrupting and resuming block transfer.

FIG. 26 is a timing diagram of assistance in explaining operations for interrupting and resuming block transfer. In this case, block transfer is resumed when DMA transfer is ended during block transfer. DMA transfer is ended after a number of words specified by the DMA transfer count register (TCR) has been transferred by DMA transfer and an interrupt occurs in the CPU 2. The CPU 2 executes an interrupt process to set a DMA memory address for the next transfer and restarts the DMAC. Since the contents of the transferred word length counter 64 remains preserved, an interrupted block transfer is continued when the next DMA transfer is started. In this example, the sum of data lengths a and b is 2048 bytes.

Figure 27:
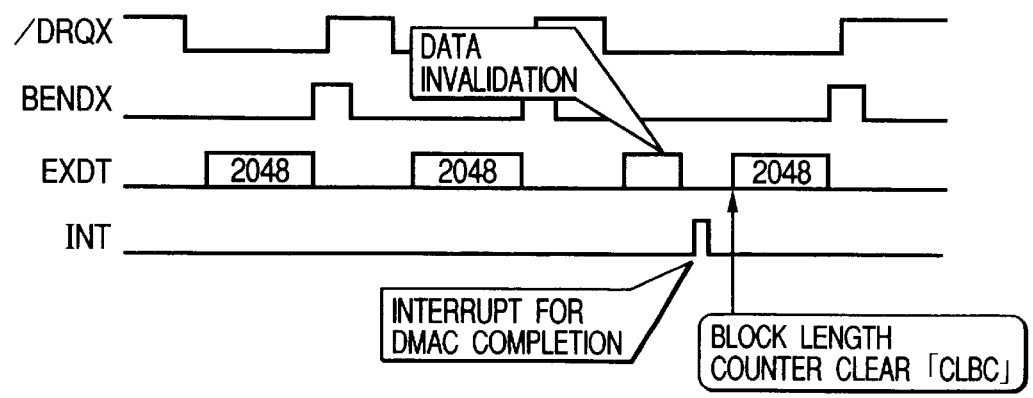
FIG. 27 is a timing diagram of assistance in explaining operations for interrupting block transfer and starting a new transfer operation.

FIG. 27 is a timing diagram of assistance in explaining operations for interrupting block transfer and starting a new transfer operation. In this example, a new block transfer operation is started upon the end of DMA transfer during a block transfer operation. For example, when the size of PCM data transferred from the input device 5 to the DRAM 3 is less than a data length necessary for conversion by the chip 6 or includes invalid data, the interrupted block transfer operation can be invalidated. When DMA transfer is ended at a caesura in a piece of music and a new piece of music is transferred, block length must be counted from the beginning in the next DMA transfer operation, the CPU 2 sets clear block transfer counter (CLBC) to clear the transferred word length counter 64 and then resets CLBC. Thus, the block for which transfer is interrupted is invalidated and a new transfer operation for transferring a block of a block length specified by the BLLEN can be started.

Figure 28:
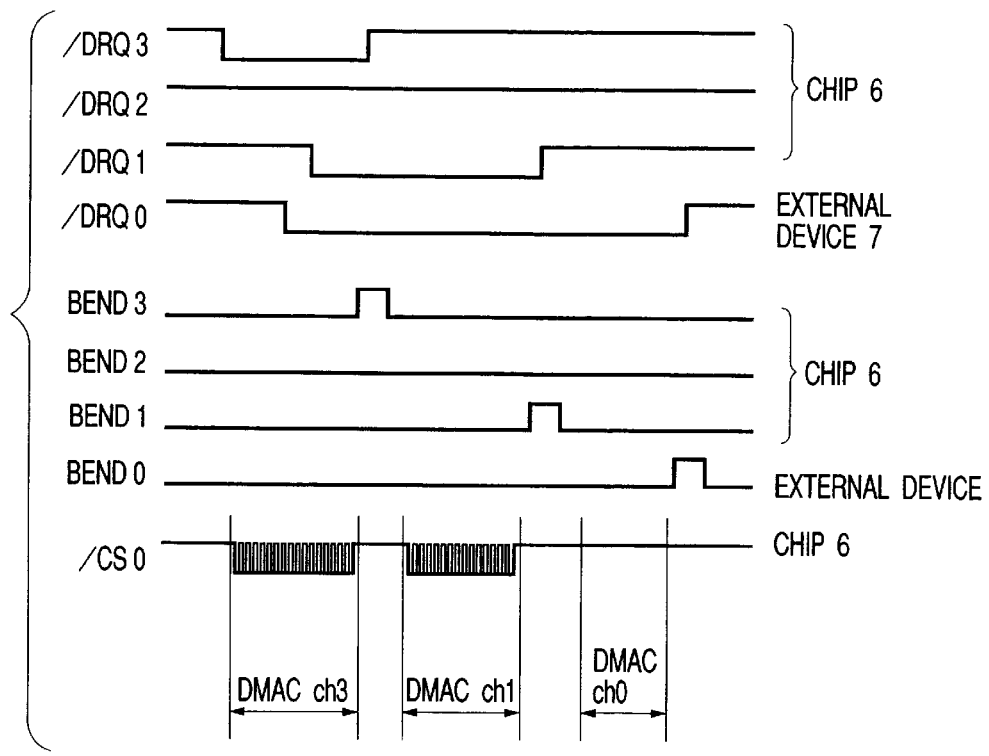
FIG. 28 is a timing diagram of assistance in explaining arbitration with respect to an extension bus.

FIG. 28 is a timing diagram of assistance in explaining arbitration of the extension bus 18. The arbiter 17 executes a switching of a bus master (bus arbitration) upon negation of a transfer request (/DRQX) signal of a DMA channel during data transfer when the chip 6 and the external device 7 try to gain access to the extension bus 18. For example, when the block transfer operation of a DMAC channel 3 has ended and a BEND3 rises, the signal is transmitted to the arbiter 17. Then, the arbiter 17 sends an enable signal to a DMAC channel 1 which has been asserting /DRQ1. Thus, a DMA transfer operation requested by the DMAC channel 1 is started. In the case shown in FIG. 28, after a DMA transfer requested by the DMA channel 3, the DMA transfer is switched to the one requested by the next DMAC channel 1 in order. The arbiter 17 executes priority control to permit the channels 3, 2, 1 and 0 to execute a DMA transfer operation in that order. Indicated at /CS0 is a chip select signal which indicates a state where the chip 6 is selected and the permitted channel executes a DMA transfer operation.

(9) Bus Arbiter

The CPU 2 and the DMACs 26, 27 and 28 issue access requests for the DRAM 3, i.e., a local memory of the bridge chip 1. The arbiter 17 controls bus access right to gain access to the DRAM 3. The arbiter 17 switches a bus master by a unit of burst transfer of the DRAM 3. The arbiter 17 executes a priority control operation in a round-robin fashion which gives the highest priority to the CPU 2 for access to the DRAM 3. When access requests are made by the devices other than the CPU 2, the access right is handed over to a bus master according to predetermined priority order. If the other bus master monopolizes the internal bus 10 when the CPU 2 makes a request to the DRAM 3, the bus cycle of the CPU 2 is inserted when the continuing burst transfer is ended. Thus the wait cycle inserted prior to the access by the CPU 2 is limited to the least extent.

The internal buses of the bridge chip 1 are duplicate buses consisting of the access bus (peripheral bus 20) to the control registers of the I/O interfaces from the CPU 2, and the data transfer bus (the internal bus 10) to the DRAM 3. Therefore, CPU 2 is able to gain access to the control registers of the I/O interface 13, 14 or 15 while the I/O interface 13, 14 or 15 is in access to the DRAM 3.

Figure 29:
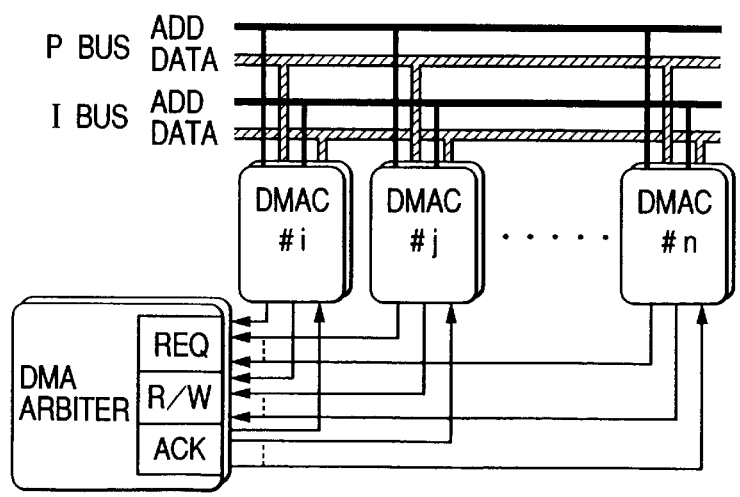
FIG. 29 is a diagrammatic view of assistance in explaining a concept of bus arbitration.

FIG. 29 shows a plurality of DMACs connected to both the I bus and the P bus as well as to a DMA arbiter. Each DMAC gives a REQ signal for requesting bus right to the use of the I bus and a R/W signal indicating read or write to the DMA arbiter. The arbiter gives an ACK signal to give bus right to the use of the I bus to a DMAC.

Figure 30:
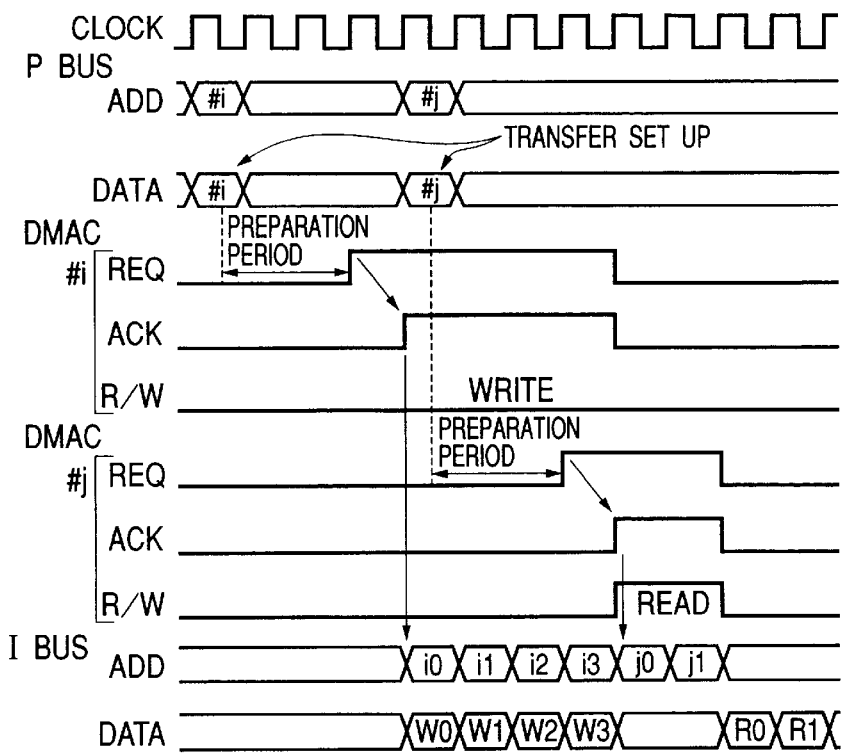
FIG. 30 is a timing diagram of assistance in explaining the switching of bus access right.

FIG. 30 is a timing diagram of assistance in explaining bus right arbitration. The P bus, a DMAC control signal and the I bus are shown in the timing diagram. An external CPU specifies a DMA starting address and a transfer data length to set DMA transfer through the P bus to the DMAC #i. The DMAC #i reads data from an address specified by the CPU in the external device and holds the same in the R/W buffer to prepare for data transfer. Upon the completion of preparation, a REQ signal is given to the DMA arbiter to request bus right to make use of the I bus. When the ACK signal is given to the DMAC #i to permit the DMAC #i to use the I bus, the DMAC #i immediately sends an address and data on the I bus for data transfer.

While the DMAC #i is in a data transfer operation, setting for the next data transfer operation is performed through the P bus to the DMAC #j. After the completion of preparation for data transfer, the DMAC #j sends a REQ signal to the DMA arbiter to request for bus right. When an ACK signal is given, the DMAC #j executes a data read operation. If a plurality of DMACs request simultaneously for bus right, a permission to use the I bus is given to each of the DMACs in predetermined order. Thus, data transfer using the I bus and DMA setting using the P bus are carried out independently and the plurality of DMACs can be applied in a switching way one after another. Consequently, any arbitration phase becomes unnecessary and the I bus using efficiency can be increased up to 100%.

(10) Conclusion

Figure 31:
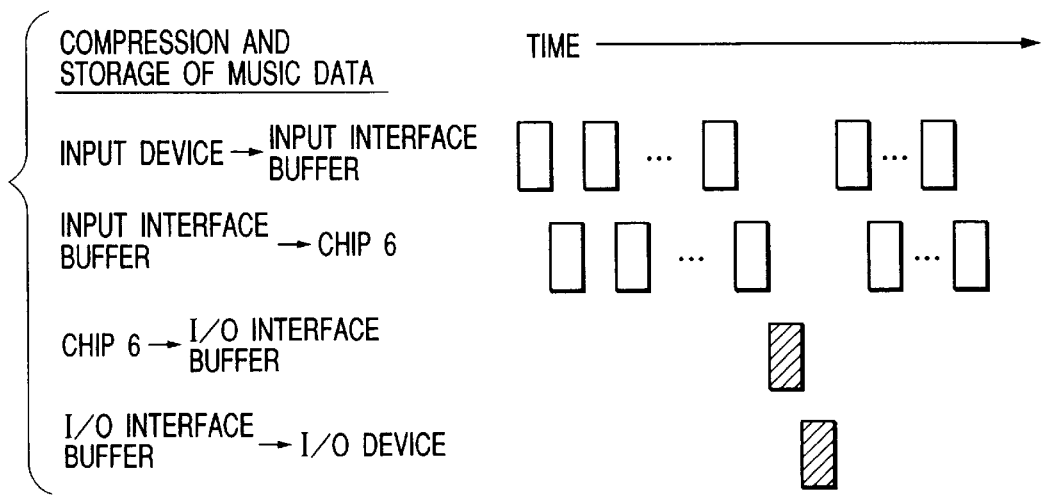
FIG. 31 is a diagrammatic view of assistance in explaining data transfer switching in a time series.

FIG. 31 is a diagrammatic view of assistance in explaining the flow of data in the compression and storage of music data on a time axis. The input device 5 stores an enormous amount of data and its read speed is lower than the read and write speed of the DRAM 3. Therefore, data stored in the input device 5 is divided into partitions corresponding to transfer bursts and the partitions are transferred sequentially to the input interface buffer 37 instead of transferring all the data to the DRAM 3 at a time, and input device data on the input interface buffer 37 is divided into partitions corresponding to transfer bursts to transfer the data from the input interface buffer 37 to the chip 6. The bridge chip 1 divides the data compressed by the chip 6 into partitions corresponding to transfer bursts to transfer the partitions sequentially to the I/O interface buffer 38. Upon the accumulation of 65,538 bytes of compressed data in the I/O interface buffer 38, the compressed data is divided into partitions corresponding to transfer bursts, and the partitions are transferred from the I/O interface buffer 38 to the I/O device 4. Thus, the transfer requester changes in a short time when transferring data between the I/O interfaces 13, 14 and 15 and the DRAM 3.

Since the I/O interfaces 13, 14 and 15 are provided with the read/write buffers 21, 22 and 23 of each size sufficient to hold burst transfer data, and the independent DMAC 26, 27 and 28, respectively, any idle bus cycle for DMACs switching is not caused even if the DMACs are switched every time the burst transfers occur on the I/O interfaces 13, 14 and 15, and hence high-speed data transfer can be achieved. Since the chip 6 exclusively for data compression and expansion or the data compression/expansion unit 35 compresses the data, the CPU 2 is not involved in the data compressing process and thence high-speed data transfer is possible. When transferring data between the DRAM 3 and the chip 6, parts unnecessary for transfer, such as the subcode of the CD, and reserved areas, such as a header areas can be skipped. Since the bridge chip 1 executes automatically a skipping operation for skipping some areas, the CPU 2 need not intervene in each skip operation and does not obstruct high-speed data transfer between the I/O interfaces 13, 14 and 15 and the DRAM 3. When analyzing the subcode and storing the header, the CPU 2 may gain access directly through the bridge chip 1 to the DRAM 3 without reading the subcode and the header area from the DRAM 3 and storing the same in its main memory, not shown in figure, which contributes to high-speed data transfer between the I/O interfaces 13, 14 and 15 and the DRAM 3. Since the CPU 2 gains access to the DMAC control registers and the I/O control registers of the I/O interfaces 13, 14 and 15 through the peripheral bus 20 separate from the internal bus 10, the CPU 2 does not obstruct high-speed data transfer between the I/O interfaces 13, 14 and 15 and the DRAM 3 through the internal bus 10.

The degree of intervention of the CPU 2 in high-speed DMA transfer can be reduced by increasing the number of words set in the DMAC control register by the CPU 2. A processing unit for an I/O device connected to the extension bus 18, such as the chip 6, is data of a comparatively small size inherent to the device, such as 2048/424 bytes, and control inherent to the device is necessary. Therefore, the CPU 2 sets a block size meeting a purpose for an extension bus block to enable the CPU 2 to handle data of such a size as a block based on the DMA transfer control, and the bridge chip 1 controls block transfer according to the block size.

As is apparent from the foregoing description, in the semiconductor device according to the present invention, the I/O interfaces are provided with independent DMACs, respectively, and some areas in the memory are skipped when transferring data. Accordingly, the semiconductor device is able to achieve efficient data transfer between the memory and the I/O devices.

What is claimed is:

1. A semiconductor device comprising:
a first interface circuit for connecting with a CPU;
a second interface circuit for connecting with a memory;
a third interface circuit for connecting with a first I/O device;
a first bus connected to said first, second, and third interface circuits; and
a bus arbiter for controlling a connection of each of said first, second and third interface circuits to said first bus,
wherein said third interface circuit includes a direct memory access controller, said direct memory access controller having a control circuit for transferring part of the data and skipping part of the data when said third interface circuit transfers the data transferred from said second interface circuit.

2. The semiconductor device according to claim 1, wherein said data contains a plurality of units each unit including a header and an element data, and the skipped part of the data is the headers of said data.

3. The semiconductor device according to claim 1, wherein said control circuit has registers for specifying a direct memory access start address, the number of words to be transferred and the number of words to be skipped.

4. The semiconductor device according to claim 3, wherein said control circuit has a counter capable of generating addresses by skipping the number of skipped words.

5. The semiconductor device according to claim 1, wherein said direct memory access controller further has a first register to store the number of blocks to be transferred, a counter to count the number of transferred blocks, and a second register to store the size of said block, in order to transfer the data as a plurality of data blocks.

6. The semiconductor device according to claim 1 further comprising a fourth interface circuit for connecting with a second I/O device, said fourth interface circuit both being connected to said first bus the connection to which is controlled by said bus arbiter and including a direct memory access controller, whereby said semiconductor device enables a data transfer between said second interface circuit and said third interface circuit and a data transfer between said second interface circuit and said fourth interface circuit.

7. The semiconductor device according to claim 1, further comprising a second bus independent of said first bus for enabling an access between said first interface circuit and said third interface circuit.

8. The semiconductor device according to claim 1, wherein said bus arbiter determines a bus master selected from among said first to third interface circuits according to a predetermined priority.

9. The semiconductor device according to claim 8, wherein said predetermined priority is selected according to a selection from a plurality of priorities respectively having different contents.

10. A semiconductor device comprising:
a first interface circuit for connecting with a CPU;
a second interface circuit for connecting with a memory;
a third interface circuit for connecting with a first I/O device;
a first bus connected to said first, second, and third interface circuits; and
a bus arbiter for controlling a connection of each of said first to third interface circuits to said first bus,
wherein said third interface circuit includes a direct memory access controller, said direct memory access controller further has a first register to store the number of blocks to be transferred, a counter to count the number of transferred blocks and a second register to store the size of said block, in order to transfer the data as a plurality of data blocks.

11. The semiconductor device according to claim 10 further comprising a second bus independent of said first bus for enabling an access between said first interface circuit and said third interface circuit.

12. A semiconductor device, comprising:
a first interface circuit for connecting with a CPU;
a second interface circuit for connecting with a memory;
a third interface circuit for connecting with a first I/O device;
a first bus connected to said first, second, and third interface circuits;
a bus arbiter for controlling a connection of each of said first, second, and third interface circuits to said first bus; and
a data compression circuit,
wherein said third interface circuit includes a direct memory access controller,
wherein said data compression circuit compresses data transferred from said second interface circuit and sends the data to said third interface circuit, and
wherein said bus arbiter determines a bus master selected from among said first to third interface circuits according to a predetermined priority.

13. The semiconductor device according to claim 12, wherein said priority is selected according to a selection from a plurality of priorities respectively having different contents.

14. An information processing system comprising a CPU, a
memory, a first I/O device and a bridge chip,
said bridge chip comprising a first interface circuit for connecting with said CPU; a
second interface circuit for connecting with said memory;
a third interface circuit for connecting with said first I/O device; a first bus connected to said first, second, and third interface circuits; and a bus arbiter for controlling a connection of each of said first to third interface circuits to said first bus, wherein said third interface circuit includes a direct memory access controller, said direct memory access controller having a control circuit for transferring part of the data and skipping part of the data when said third interface circuit transfers the data stored in said memory to said first I/O device.

15. The information processing system according to claim 14, wherein the data stored in said memory contains a plurality of units each unit including a header and an element data, and the skipped part of the data is the headers of said data.

16. The information processing system according to claim 14, wherein said control circuit has registers for specifying a direct memory access start address, the number of words to be transferred and the number of words to be skipped.

17. The information processing system according to claim 16, wherein the control circuit has a counter capable of generating addresses by skipping the number of skipped words.

18. The information processing system according to claim 14, wherein said direct memory access controller further has a first register to store the number of blocks to be transferred, a counter to count the number of transferred blocks and a second register to store the size of said block, in order to transfer the data as a plurality of data blocks.

* * * * *